(12) United States Patent
Zhang et al.

(10) Patent No.: US 11,950,568 B2
(45) Date of Patent: Apr. 9, 2024

(54) PET COMB

(71) Applicant: NINGBO HONGDU MODEL PLASTICS CO., LTD., Ningbo (CN)

(72) Inventors: Jinchun Zhang, Ningbo (CN); Xin Di, Ningbo (CN)

(73) Assignee: NINGBO HONGDU MODEL PLASTICS CO., LTD., Ningbo (CN)

( * ) Notice: Subject to any disclaimer, the term of this patent is extended or adjusted under 35 U.S.C. 154(b) by 119 days.

(21) Appl. No.: 17/597,839

(22) PCT Filed: Feb. 27, 2020

(86) PCT No.: PCT/CN2020/076873
§ 371 (c)(1),
(2) Date: Jan. 25, 2022

(87) PCT Pub. No.: WO2020/253261
PCT Pub. Date: Dec. 24, 2020

(65) Prior Publication Data
US 2022/0279756 A1 Sep. 8, 2022

(30) Foreign Application Priority Data

Jun. 17, 2019 (CN) .......................... 201910521541.1
Sep. 10, 2019 (CN) .......................... 201910851196.8
Sep. 10, 2019 (CN) .......................... 201921503099.1

(51) Int. Cl.
*A01K 13/00* (2006.01)
(52) U.S. Cl.
CPC .............................. *A01K 13/002* (2013.01)

(58) Field of Classification Search
CPC ...... A01K 13/002; A01K 13/00; A01K 14/00; B26B 19/20; B26B 19/22; B26B 19/24;
(Continued)

(56) References Cited

U.S. PATENT DOCUMENTS 347,207 A * 8/1886 Smith ..................... B26B 19/20
30/201
658,094 A * 9/1900 Palmer .................... B26B 19/24
30/220
(Continued)

FOREIGN PATENT DOCUMENTS

CN        1334763 A      2/2002
CN        206909410 U    1/2018
(Continued)

*Primary Examiner* — Timothy D Collins
*Assistant Examiner* — Maria E Graber
(74) *Attorney, Agent, or Firm* — Bayramoglu Law Offices LLC

(57) ABSTRACT

A pet comb includes a handle, a mounting head and a comb body. The comb body includes a row of striped comb teeth; a blade side of the striped comb teeth includes a combing portion disposed at an outer section and a blade portion disposed at an inner section; the striped comb teeth are provided with a blade blocking portion extending in the same direction as the striped comb teeth on the side of the blade side; at least part of the combing portion exceeds the free end of the blade blocking portion, and the blade blocking portion blocks at least part of the blade portion; the combing portion is configured to provide a combing function for the comb, and the blade portion is configured to provide a function of cutting hair for the comb so as to disentangle or thin the hair.

11 Claims, 25 Drawing Sheets

(58) Field of Classification Search
CPC ......... B26B 19/00; B26B 19/02; B26B 19/06; B26B 19/28; B26B 19/282; B26B 19/284
USPC .......................................................... 119/625
See application file for complete search history.

(56) References Cited

U.S. PATENT DOCUMENTS

| | | | | | |
|---|---|---|---|---|---|
| 1,644,140 | A * | 10/1927 | McArdle | ................ | B26B 19/24 126/110 R |
| 1,723,323 | A * | 8/1929 | Bartlett | ................... | B26B 19/24 30/223 |
| 2,103,418 | A * | 12/1937 | Hagebeuker | ............ | B26B 19/20 30/202 |
| 2,375,262 | A * | 5/1945 | Turner | ................... | B26B 19/24 30/222 |
| 2,480,920 | A * | 9/1949 | Gullong | .................. | B26B 19/20 30/202 |
| 3,259,979 | A * | 7/1966 | Klinder | ................... | B26B 19/20 30/201 |
| 4,532,707 | A * | 8/1985 | Allen | ...................... | B26B 19/20 30/200 |
| 4,622,745 | A * | 11/1986 | Wahl | ....................... | B26B 19/20 30/201 |
| 7,073,262 | B2 * | 7/2006 | Melton | ............... | B26B 19/3813 30/200 |
| 8,844,142 | B2 * | 9/2014 | Kammer | ................ | B26B 19/20 30/201 |
| D720,897 | S * | 1/2015 | Fancelli | ....................... | D30/158 |
| 10,040,208 | B2 * | 8/2018 | Darwinkel | .............. | B26B 19/20 |
| 10,105,856 | B2 * | 10/2018 | Tuijp | ....................... | B26B 19/20 |
| 10,843,353 | B2 * | 11/2020 | Phoon | ..................... | B26B 19/20 |
| 2007/0204469 | A1 * | 9/2007 | Caric | ....................... | B26B 19/06 30/201 |
| 2012/0084983 | A1 * | 4/2012 | Moseman | ............... | B26B 19/28 30/42 |
| 2012/0233865 | A1 * | 9/2012 | Kammer | .............. | B26B 19/3846 30/201 |
| 2014/0259689 | A1 * | 9/2014 | Lau | ..................... | B26B 19/3846 30/241 |
| 2017/0136637 | A1 * | 5/2017 | Phoon | ................. | B26B 19/3813 |
| 2017/0215379 | A1 | 8/2017 | Hadden | | |
| 2022/0055238 | A1 * | 2/2022 | Huang | ..................... | B26B 19/20 |

FOREIGN PATENT DOCUMENTS

| | | | | |
|---|---|---|---|---|
| CN | 208163701 U | | 11/2018 | |
| CN | 108990827 A | | 12/2018 | |
| CN | 208175739 U | | 12/2018 | |
| CN | 110089450 A | | 8/2019 | |
| CN | 110432170 A | | 11/2019 | |
| GB | 2209985 A | * | 6/1989 | ............. B26B 19/24 |
| JP | 2001190871 A | | 7/2001 | |
| WO | WO-2005123354 A1 | * | 12/2005 | ............. B26B 19/06 |
| WO | WO-2015028330 A1 | * | 3/2015 | ......... B26B 19/3846 |
| WO | WO-2015197272 A1 | * | 12/2015 | ............. B26B 19/24 |

* cited by examiner

PET COMB

CROSS REFERENCE TO THE RELATED APPLICATIONS

This application is the national phase entry of International Application No. PCT/CN2020/076873, filed on Feb. 27, 2020, which is based upon and claims priority to Chinese Patent Applications No. 201910521541.1, filed on Jun. 17, 2019; No. 201910851196.8, filed on Sep. 10, 2019; No. 201921503099.1, filed on Sep. 10, 2019; the entire contents of which are incorporated herein by reference.

TECHNICAL FIELD

The present disclosure relates to a pet comb. In particular, the present disclosure relates to a pet comb suitable for combing, disentangling and/or thinning the hair/fur of a pet.

BACKGROUND

More and more modern households are increasing their appetite for incorporating pets into their homes. With the introduction of pets, an important factor for sufficiently caring for the pet is to groom and manage their hair/fur that may inevitably be shed or become entangled.

Various devices exist for grooming the hair/fur of pets in order to manage shedding or neatly disentangling said hair, such as brushes, combs, scissors and razors. Each of these devices are typically adapted for a specific purpose such as to brush hair, comb hair, clean up shed hair, thin hair or cut hair. In addition to these devices, there are also devices that are used to perform more than one purpose, such as to perform the combined action of both brush hair and clean up shed hair. Often, such "combination devices" include a combing portion and one or more blade for shaving hair.

These devices struggle with combing the pet hair when it is entangled, causing the combination device to become stuck, cause discomfort to the pet and prevent a user from successfully grooming the pet. Additionally these devices, particularly those including one or more blade for shaving hair, present a hazard to both the pet and the user due to their edge that may cause a cut/laceration when used incorrectly (such as at an inappropriate angle) or in error.

It would be advantageous to provide a device suitable for combing, disentangling and/or thinning the hair/fur of a pet that minimises chances of becoming stuck when the pet hair is entangled, and is not hazardous to either the pet or the user if used incorrectly or in error.

It is against this background and the problems and difficulties associated therewith, that the present disclosure has been developed.

SUMMARY

The technical problem to be solved by the present disclosure is to provide a pet comb that avoids cutting the pet's skin or the user's hand. The pet comb can also selectively provide a hair combing function, or a function or hair disentanglement and thinning.

Another technical problem to be solved by the present disclosure is to provide a pet comb that avoids cutting the user's hand without affecting the efficiency of hair combing, disentanglement or thinning.

The technical solutions adopted by the present disclosure to solve the above technical problems are: a pet comb comprises a handle, a mounting head and a comb body; wherein the comb body comprises a row of striped comb teeth; wherein a blade side of the striped comb teeth comprises a combing portion disposed at an outer section and a blade portion disposed at an inner section; wherein the striped comb teeth are provided with a blade blocking portion extending in a direction of the striped comb teeth on the blade side; whereby at least part of the combing portion exceeds the free end of the blade blocking portion, and the blade blocking portion blocks at least part of the blade portion.

According to a first aspect, there is provided a pet comb, comprising: a handle, a mounting head and a comb body; wherein the comb body comprises a row of striped comb teeth; wherein a blade side of the striped comb teeth comprises a combing portion disposed at an outer section and a blade portion disposed at an inner section; wherein the striped comb teeth are provided with a blade blocking portion extending in a direction of the striped comb teeth on the blade side; whereby at least part of the combing portion exceeds the free end of the blade blocking portion, and the blade blocking portion blocks at least part of the blade portion.

In one form, the free end of the blade blocking portion exceeds a boundary of the combing portion and the blade portion; or the free end of the blade blocking portion does not exceed the boundary of the combing portion and the blade portion.

In one form, the blade blocking portion is fixed or movable, wherein an extending length of the movable blade blocking portion is adjustable.

In one form, the blade blocking portion is fixedly or movably disposed on a hair removal plate or the mounting head.

In one form, the blade blocking portion and the blade portion are separated by a distance, and the blade blocking portion is configured so as to prevent a user from being injured or cut by the blade portion.

In one form, the blade blocking portion is a blade blocking plate connected to the hair removal plate by a connecting portion.

In one form, the blade blocking plate extends in parallel with the striped comb teeth.

In one form, the hair removal plate is integrated with the blade blocking plate, wherein the hair removal plate and the blade blocking plate is made of plastic, metal or other materials.

In one form, the pet comb further comprises a restriction portion, wherein the restriction portion is provided on an alternate side of the striped comb teeth, and the restriction portion and the free end of the blade blocking portion together restrict hair and an inner end of the blade portion.

In one form, the restriction portion is fixedly or movably disposed on the mounting head, the comb body or the hair removal plate.

In one form, relative positions of the blade portion, the restriction portion and the blade blocking portion are adjustable and fixable.

In one form, the restriction portion is integrated with the hair removal plate, wherein the hair removal plate and the blade blocking plate are made of plastic, metal or other materials.

In one form, the blade portion is disposed at an inner side of a connection line between a free end of the restriction portion and the free end of the blade blocking portion, while the combing portion still exceeds the blade blocking portion.

According to a second aspect, there is provided a pet comb comprising: a handle, a mounting head and a comb body; wherein the comb body comprises a row of striped comb teeth; wherein a blade portion is provided on a rear side of the striped comb teeth; wherein the striped comb teeth are provided with a blade blocking portion extending in a direction of the striped comb teeth on the side with the blade portion; whereby a plurality of hair channels allow hair to enter gaps among the combing teeth and having the same direction as the striped teeth are provided on the blade blocking portion.

In one form, a width of the plurality of hair channels equals to the width of at least one of the combing teeth.

In one form, the blade portion is distributed on at least part of the rear side of the striped comb.

In one form, a free end of the blade blocking portion does not exceed a free end of the striped comb.

In one form, a blade side of the striped comb teeth comprises a combing portion disposed at an outer section of the blade portion disposed at an inner section, wherein the free end of the blade blocking portion exceeds a boundary of the combing portion and the blade portion; or the free end of the blade blocking portion does not exceed the boundary of the combing portion and the blade portion.

In one form, the blade blocking portion is fixed or movable, wherein an extending length of the movable blade blocking portion is adjustable.

In one form, the blade blocking portion is fixedly or movably disposed on a hair removal plate or the mounting head.

In one form, the blade blocking portion and the blade portion are separated by a distance.

In one form, the blade blocking portion is a blade blocking plate connected to the hair removal plate by a connecting portion.

In one form, the blade blocking plate extends in parallel with the striped combing teeth.

In one form, the hair removal plate is integrated with the blade blocking plate, wherein the hair removal plate and the blade blocking plate are made of plastic, metal or other materials.

BRIEF DESCRIPTION OF THE DRAWINGS

Embodiments of the present disclosure will be discussed with reference to the accompanying drawings wherein.

In the following description, like reference characters designate like or corresponding parts throughout the figures.

DETAILED DESCRIPTION OF THE EMBODIMENTS

Figure 1:
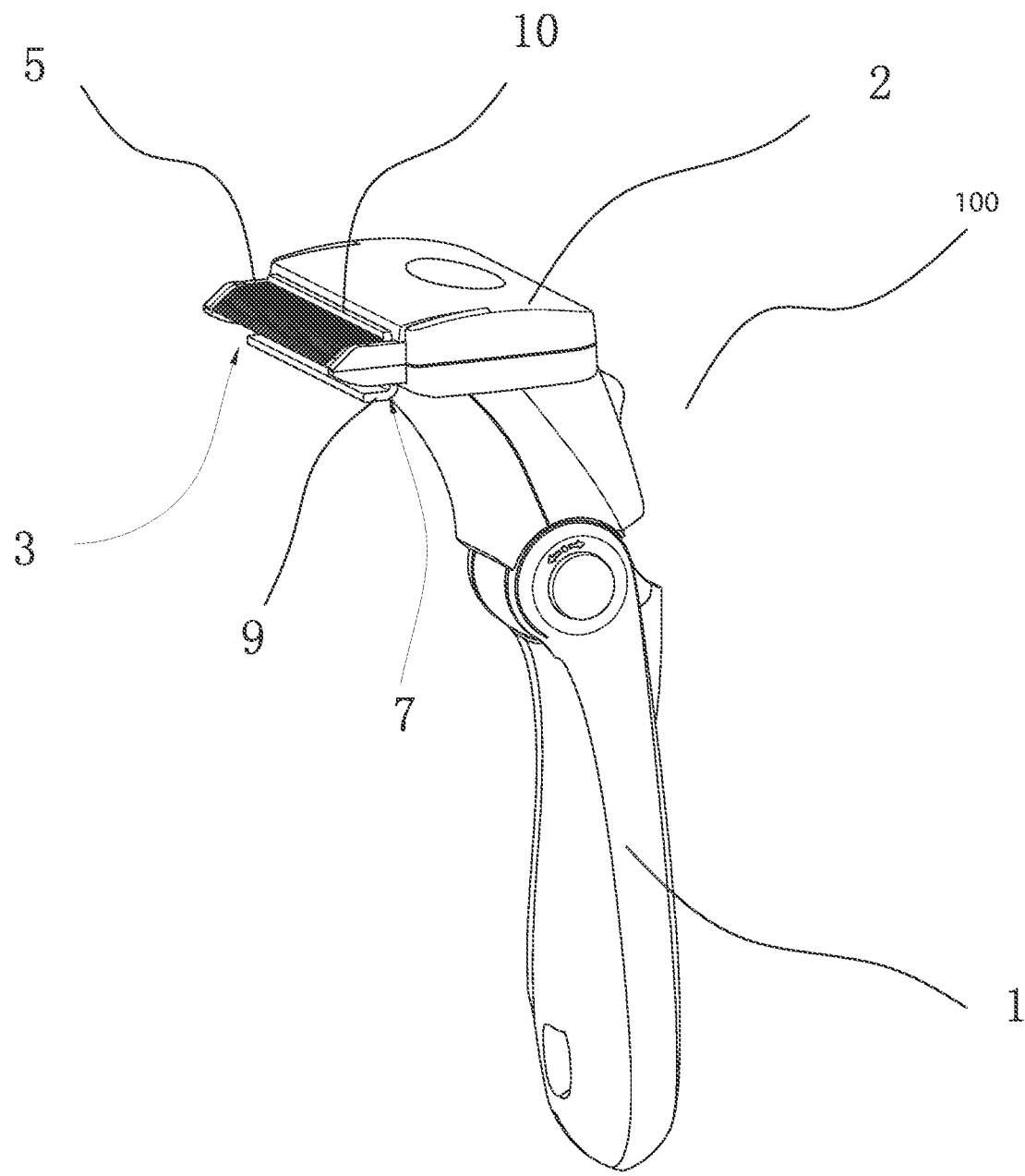
FIG. 1 is a perspective view of a first embodiment of a pet comb.
Figure 2:
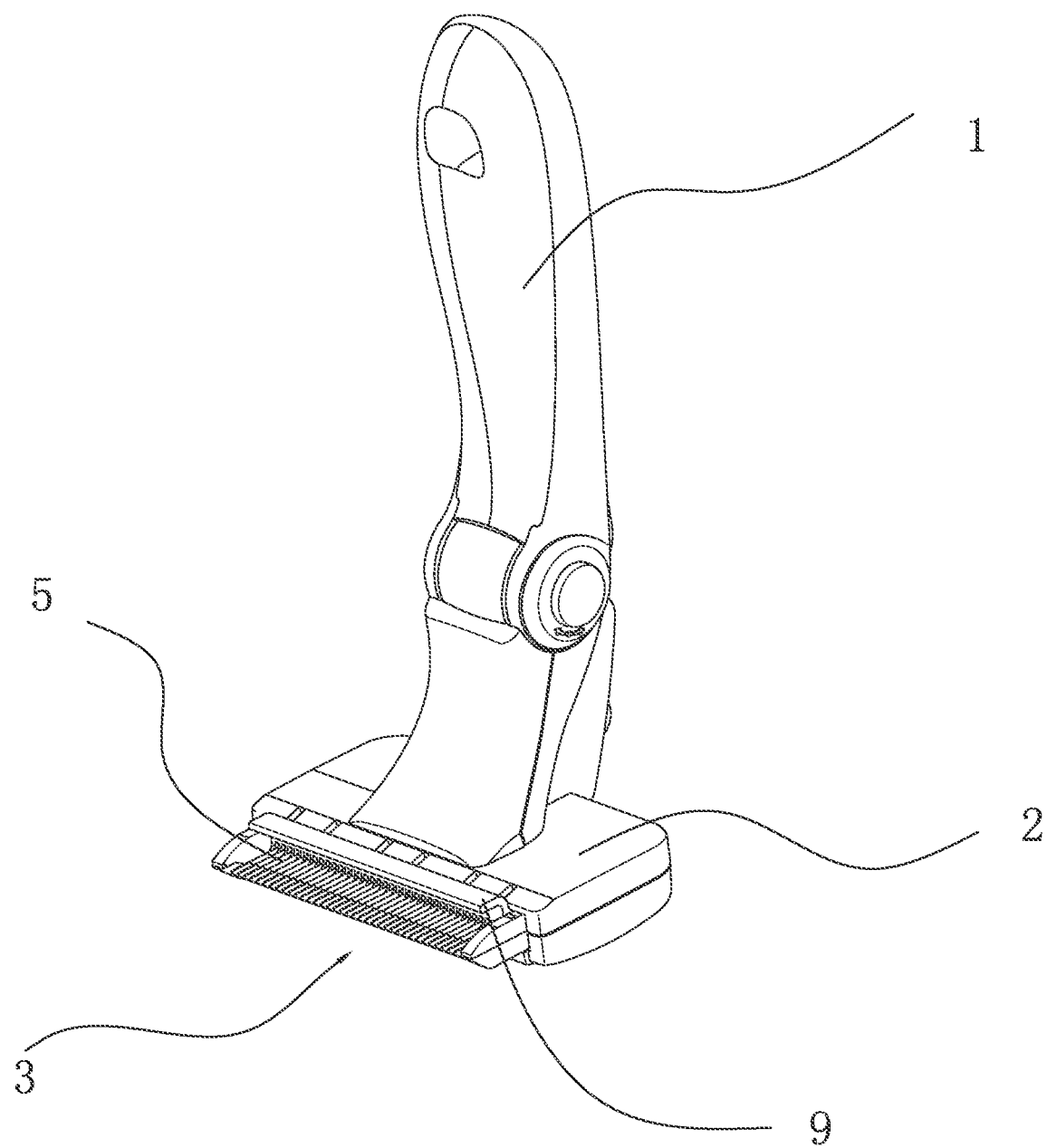
FIG. 2 is an alternate perspective view of the pet comb of FIG. 1.
Figure 3:
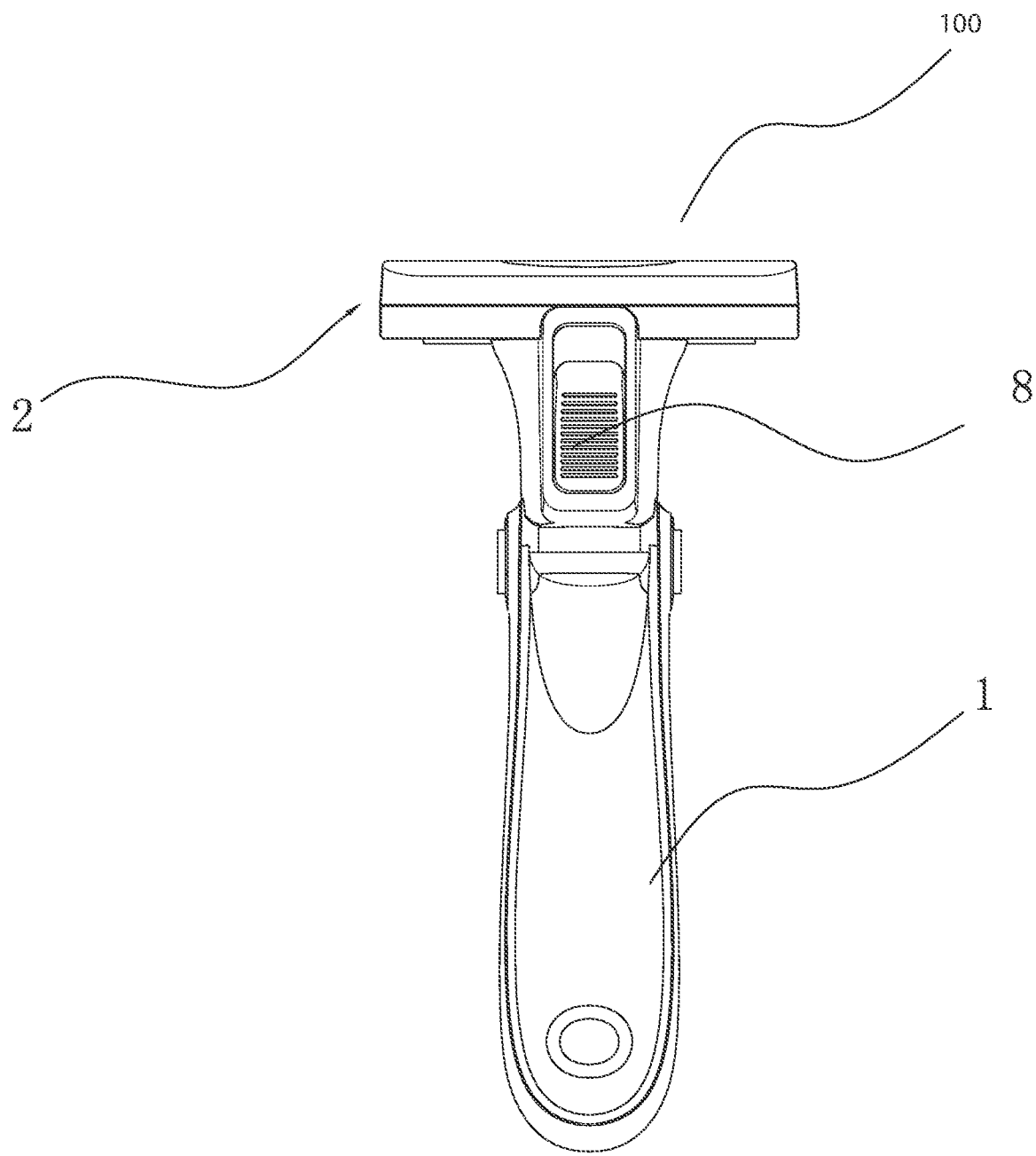
FIG. 3 is a schematic rear view of the pet comb of any one of FIG. 1 or 2.
Figure 4:
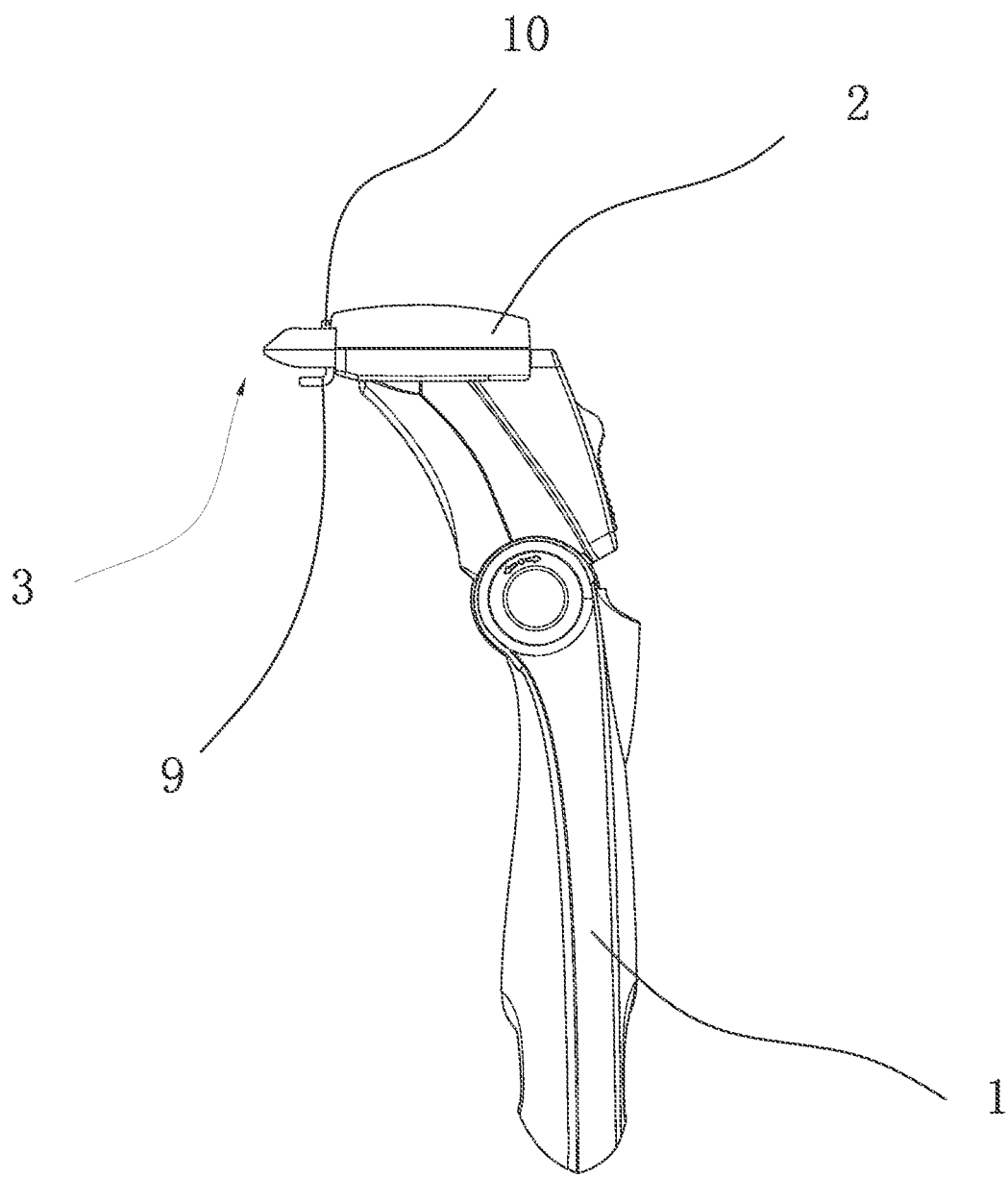
FIG. 4 is a schematic side view of the pet comb of any one of FIGS. 1 to 3.
Figure 5:
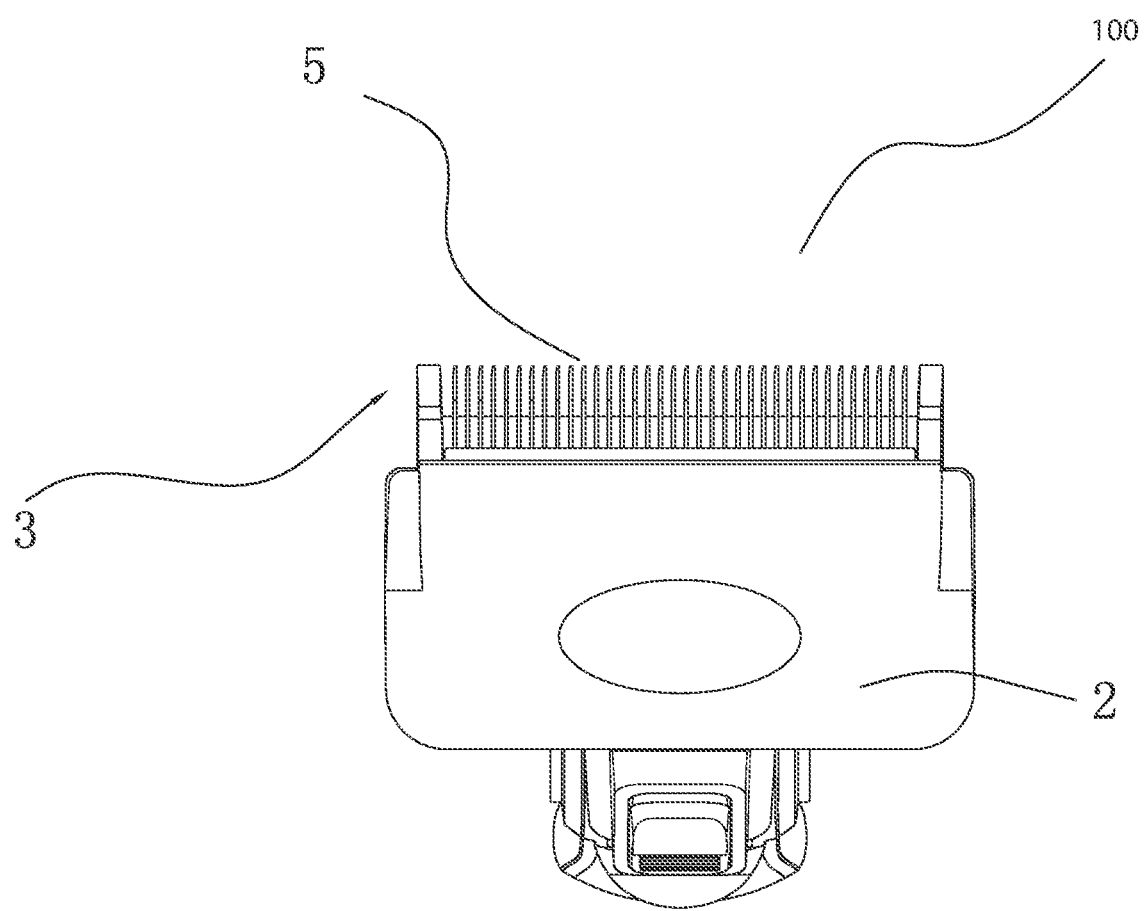
FIG. 5 is a schematic top view of the pet comb of any one of FIGS. 1 to 4.
Figure 6:
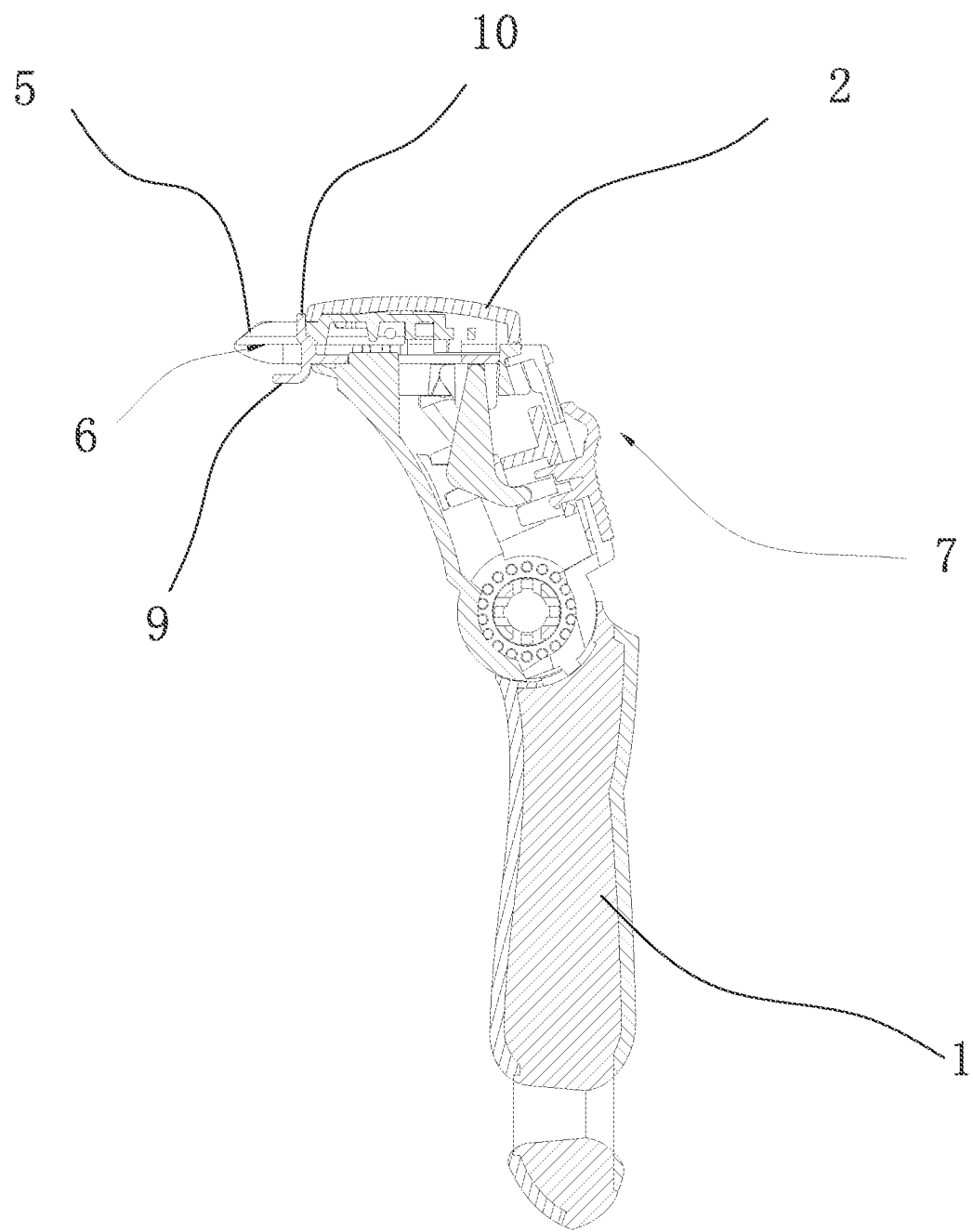
FIG. 6 is a schematic sectional side view of the pet comb along X-X of FIG. 5.

Throughout this disclosure, it will be appreciated that the directional or positional relationships referred to by the terms "up", "down", "inside", "outside" and the like are based on the directions or position relationships illustrated by the Figures, and are merely to best describe the present disclosure, by simplifying the description rather than indicating or implying that the device or element referred to must have a particular orientation, be constructed and operate in a particular orientation, and therefore should not be construed as limiting the disclosure. In addition, the terms "first" and "second" are only used to better describe the present disclosure based on the Figures, and are not intended to limit the scope of the present disclosure.

It will be appreciated that the present disclosure provides an improved pet cosmetic tool, in the form of a pet comb (100) that may take care of pet hair (also may be referred to as 'pet fur') and is suitable for furry pets (may also be referred to as 'hairy pets'), such as cats and dogs. It may be suitably used for combing pet hair, removing shed hair from pets and cutting disentangled pet hair to make the pet hair more neat and smooth. In addition, advantageously, it will be appreciated that the pet comb (100) as disclosed herein may thin pet hair. It will be appreciated by those skilled in the art that the pet comb provided by the present disclosure advantageously may also prevent the pet's skin or the user's hand from being injured or cut by a blade used to cut, comb or remove hair, which is convenient and safe for both the user and the pet to use.

First Embodiment

As shown in any one of FIGS. 1 to 7, there is illustrated a first embodiment of a pet comb 100 comprising a handle 1, a mounting head 2, and a comb body 3. The handle 1 may be connected to the mounting head 2, and the comb body 3 may be assembled with the mounting head 2. In this way, the comb body 3 may comprise a row of striped comb teeth 5 arranged side by side, with a gap interposed between each of the striped comb teeth 5 arranged side by side. In this way, the striped comb teeth 5 of the pet comb 100 may be similar to a conventional household comb (not shown), as the striped comb teeth 5 may function so as to comb hair. In use, when the striped comb teeth 5 are moved along in a direction of hair growth, the hair may be arranged smoothly in a certain direction (i.e. make the pet hair more neat and smooth). Alternatively, also in use, when the striped comb teeth 5 act on a pet body 200 with a suitable angle therebetween, it is advantageous for a user (not shown) to pull the pet comb 100 more conveniently to change the combing position and direction. The handle 1 may be a shape that allows the user to operate the pet comb 100 under the suitable angle. The handle 1 may be designed so as to be a rod shape extending along an axis, and is mostly arc-shaped, as illustrated by any one of FIGS. 1 to 4, 6 to 7 and 19 to 20.

Figure 7:
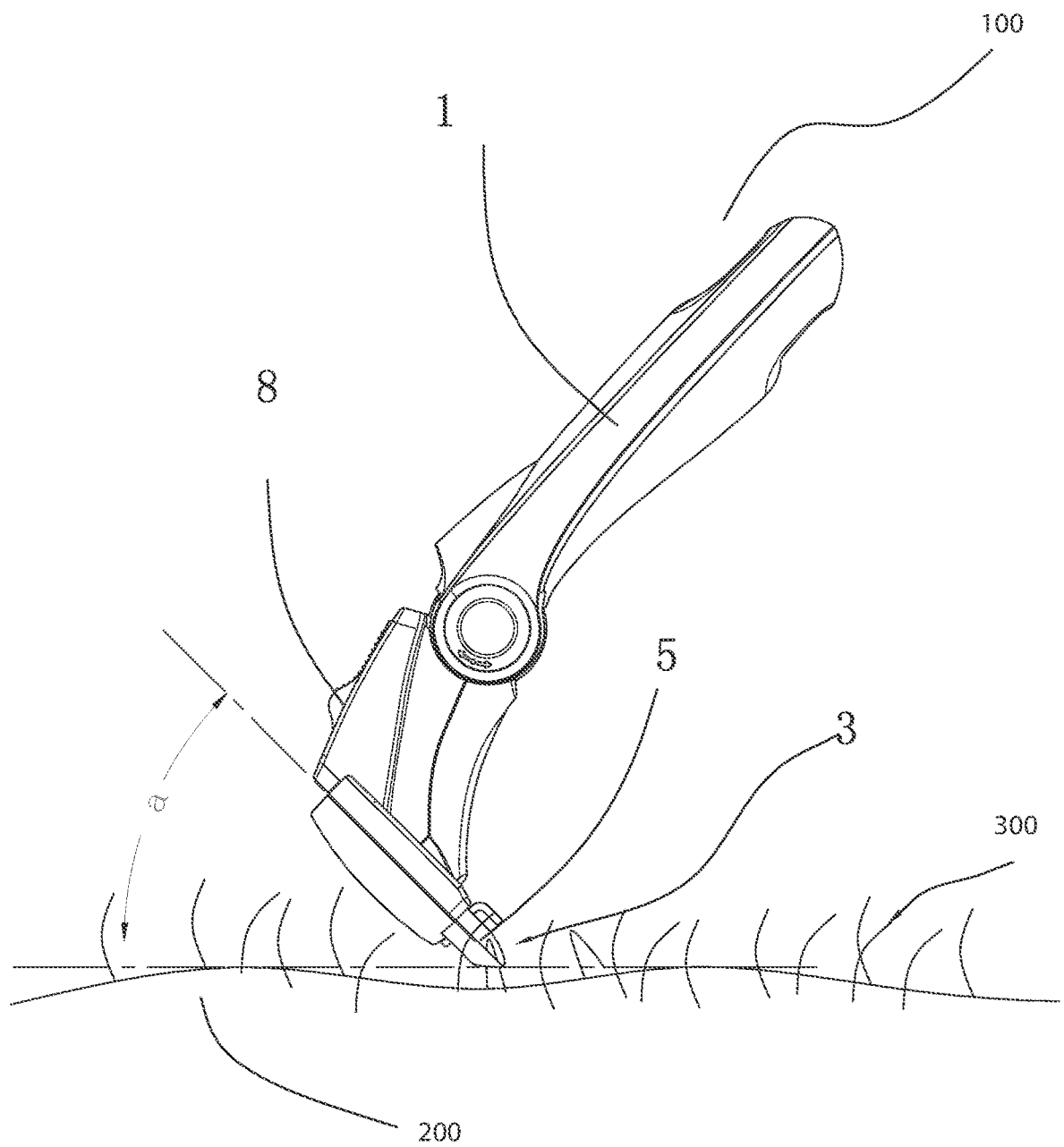
FIG. 7 is a schematic side view of the pet comb of any one of FIGS. 1 to 6 in use.

Pet hair 300 is often entangled, and in order to arrange the hair smoothly, as illustrated in FIG. 7, a blade portion 6 may be provided at a rear section of the striped comb teeth 5, the blade portion 6 may extend in the same direction as the striped comb teeth 5. That is, the direction may be consistent with the direction in which the pet comb 100 moves when combing the pet hair 300. When the user pulls the pet comb 100, a combing portion 50 of the striped comb teeth 5 may separate loose pet hair 300, and in this way the blade portion 6 acts on the entangled pet hair 300 connected between the striped comb teeth 5, thereby advantageously cutting it.

Figure 8:
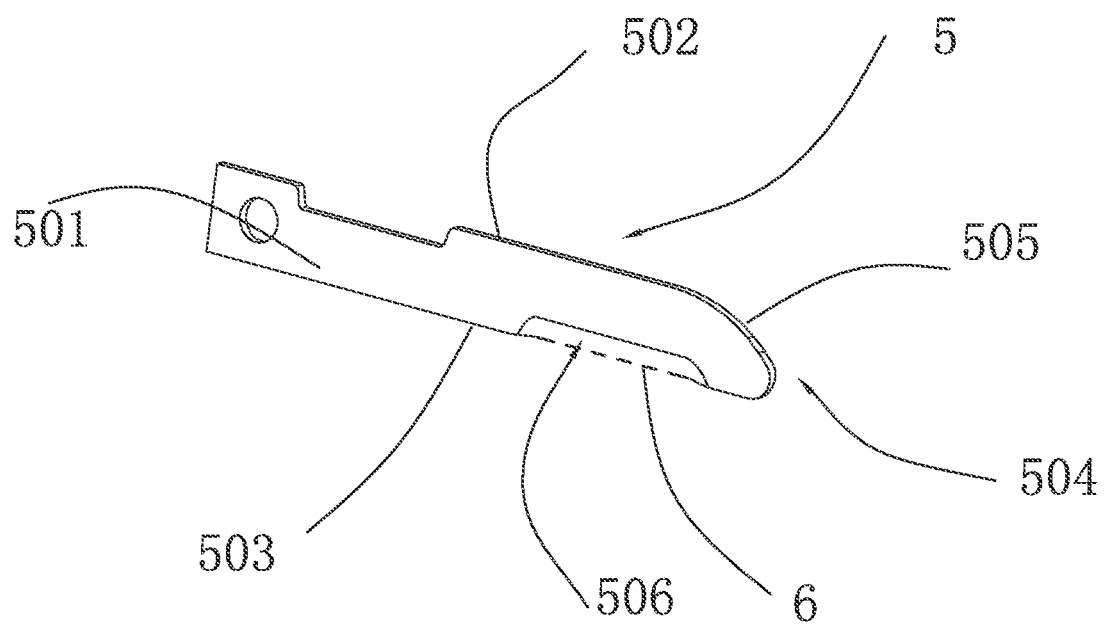
FIG. 8 is a perspective view of an embodiment of a striped comb teeth.
Figure 9:
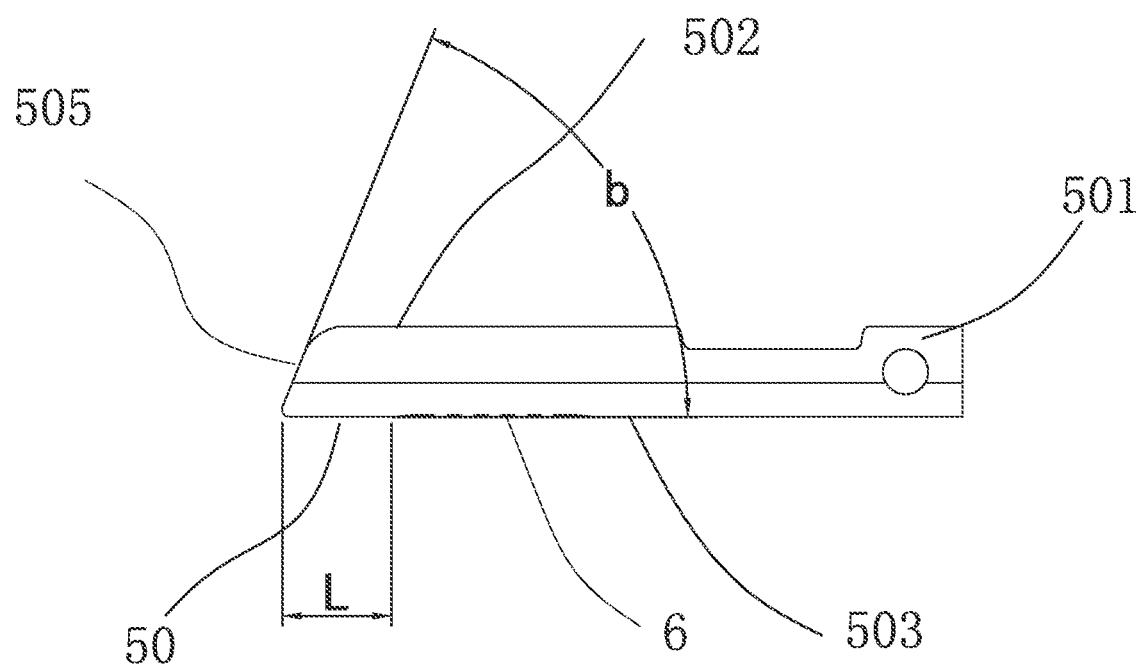
FIG. 9 is a side view of the striped comb teeth of FIG. 8.

As shown in any one of FIG. 8 or 9, the striped comb teeth 5 may comprise an upper edge 502, a lower edge 503, and a front edge 504 in addition to a connecting end 501 which may be connected to the mounting head 2. Preferably, in this embodiment, the upper edge 502 and the lower edge 503 of the striped comb teeth 5 are parallel, while the front edge 504 thereof has a substantially flat inclined side 505; the inclined side 505 and the lower edge 503 are extended to meet each other at an acute angle (as illustrated in any one of FIG. 8 or 9). Referring now to FIG. 7, an angle b of the striped comb teeth 5 may be related to an inclination angle a defined between the striped comb teeth 5 and the pet body 200 when they are in contact with each other. The angle a is designed to allow the user to determine if to contact the front edge 504 of the striped comb teeth 5 with the pet skin 200 according to the condition of the pet hair 300; in this embodiment, the angle b may be between 25 to 60°. In order to avoid injuring or cutting the pet body 200 via sharp corners such as the front edge 504 of the striped comb teeth 5, a circular arc transition (illustrated by any one of FIGS. 8 and 9) may be designed between the inclined side 505 and the upper edge 502, and between the inclined side 505 and the lower edge 503. In this embodiment, the arc between the inclined side 505 and the upper edge 502 has a radius of 1.92 mm, and the arc between the inclined side 505 and the lower edge 503 has a radius of 0.5 mm.

The lower edge 503 of the striped comb teeth 5 may be provided with a striped notch 506, wherein the blade portion 6 may be disposed. The structure of the striped comb teeth 5 and the blade portion 6 is introduced in Publication No. CN208175739 with the same applicant, and will not be further described in detail in this disclosure. A foremost end of the blade portion 6 and a foremost end of the striped comb teeth 5 are separated by a distance. The combing portion 50 is provided in the distance, the distance being preferably configured to allow the combing portion 50 to comb the hair 300 suitably. In addition, this distance between the blade portion 6 and a foremost end of the striped comb teeth 5 may also be related to the moving position of a blade blocking portion 9 (illustrated in any one of FIGS. 10 to 18). It will be appreciated by those skilled in the art, that the blade portion 6 may have other shapes, beyond that discussed or illustrated in the present disclosure, such as a straight shape, a C shape, or a wave shape.

Figure 10:
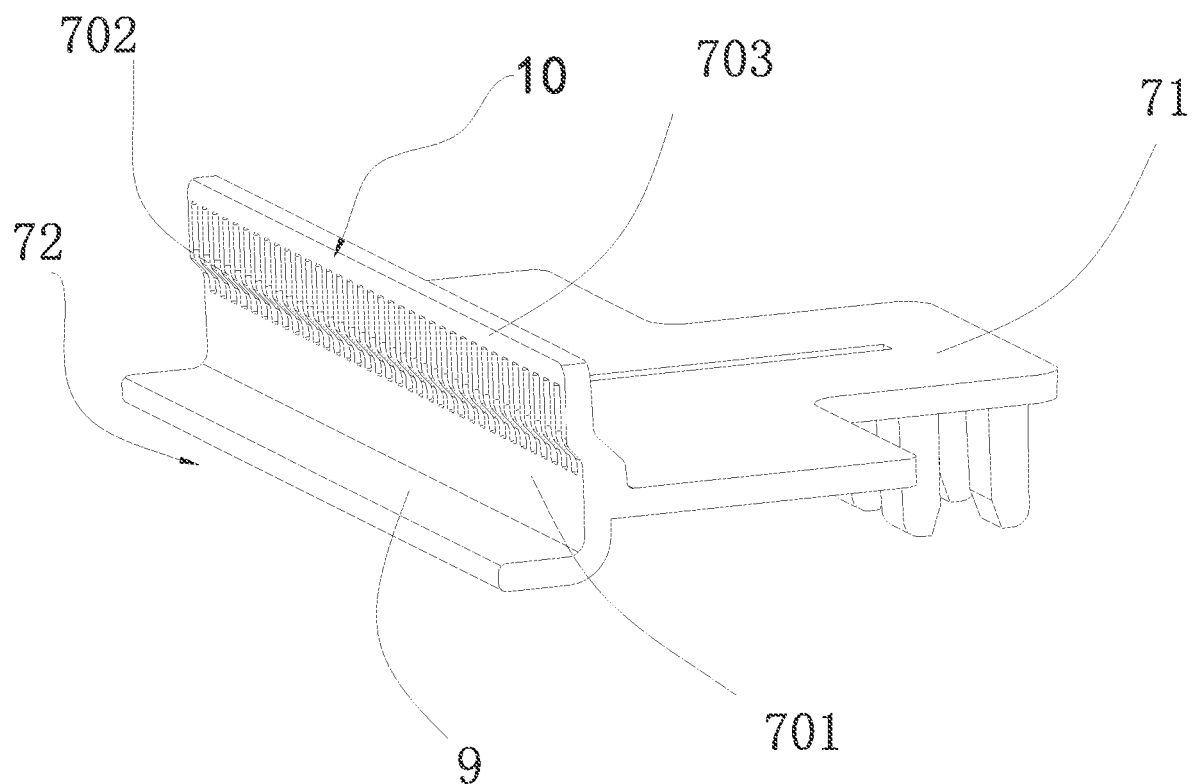
FIG. 10 is a perspective view of an embodiment of a pushing portion.
Figure 11:
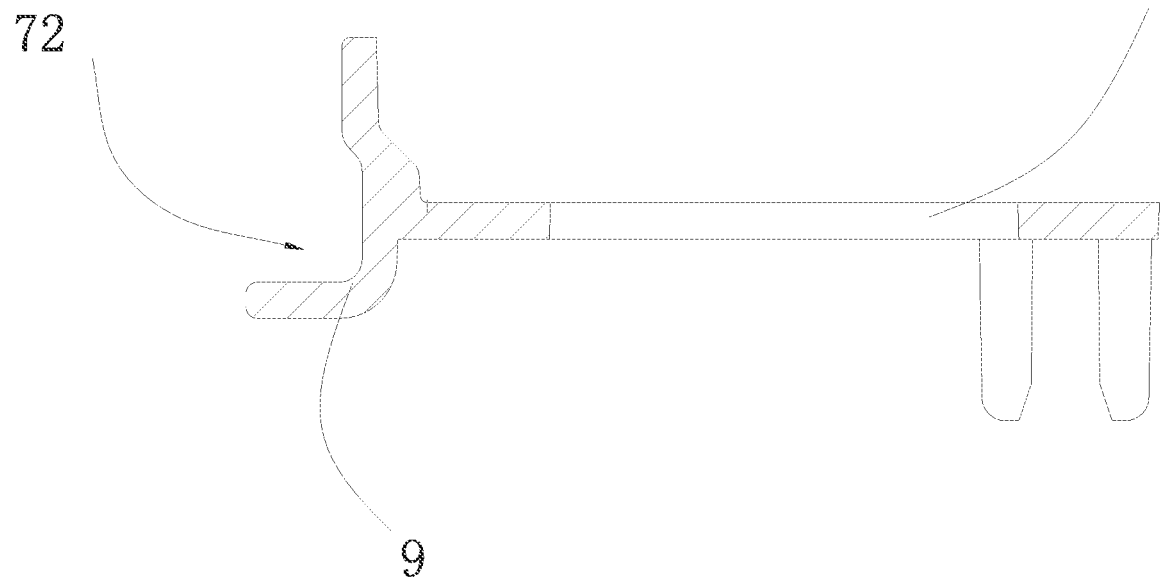
FIG. 11 is a side view of the pushing portion of FIG. 10.

As illustrated by any one of FIG. 1 or 10, the pet comb 100 in this embodiment may further comprise a hair removal plate 7. The hair removal plate 7 may be assembled in the mounting head 2 and may be configured so as to mate with the comb body 3. The hair removal plate 7 may comprise a push plate 71 and a pushing portion 72. The pushing portion 72 may comprise a tooth gap so as to match the gap between the striped comb teeth 5, thereby allowing the striped comb teeth 5 to pass therethrough. The pushing portion 72 may further comprise a rear pushing portion 701, a gap pushing portion 702 and a front pushing portion 703. The pushing portion 72 may be connected to the pushing plate 71, and the other end of the push plate 71 may be connected to a control button 8 provided on an upper side of the handle 1. The push plate 71 may be adjusted to move forward and backward by sliding the control button 8 up and down, such that the pushing portion 72 may move between the root and the front end of the striped comb teeth 5. During movement of the pushing portion 72, the hair 300 attached to the striped comb teeth 5 may be removed. A steering transmission mechanism may be provided between the control button 8 and the hair removal plate 7 (illustrated by any one of FIG. 6 or 12 to 18). Upward force acting on the control button 8 can be transmitted by the steering transmission mechanism and accordingly make the push plate 71 substantially translationally move to the front end of the striped comb teeth 5.

The specific structure of the hair removal plate 7 has been described in detail in Publication No. CN108990827 A by the same applicant, and will not be further described in detail in this disclosure. However, it should be noted that, a blade blocking portion 9 and a restriction portion connected to the hair removal plate 7 in this embodiment may affect the detailed structure, and provide for the advantageous features of the hair removal plate 7 and thus the pet comb 100.

As shown in any one of FIGS. 1, 2, 4, 6, and 10 to 18, the striped comb teeth 5 of the pet comb 100 may be provided with the blade blocking portion 9 on the side extending in the same direction as the striped comb teeth 5. Advantageously, in this way, the blade blocking portion 9 may block at least part of the blade portion 6. In use, when the user combs the pet hair 300, the contact angle between the pet comb 100 and the pet body 200 may change, particularly so when the hair 300 is entangled, proper force is needed. However, the force may be applied in a different angle, during which the pet body 200 (or the pet's skin) may be injured or cut, and the user's fingers may also be injured or cut. In this embodiment of the present disclosure, the blade blocking portion 9 covers the blade portion 6 so as to prevent the blade portion 6 from being exposed, thereby reducing the risk of injury to the pet and/or the user during use of the comb 100, and the risk that the user or pet body 200 may be cut or injured by the blade portion 6 due to accidental contact with the lower edge 503 of the striped comb teeth 5 during use of the pet comb 100 or deposition thereof.

The relative position between the blade blocking portion 9 and the blade portion 6 may be fixed or variable, depending on the assembly of the blade blocking portion 9 being fixed or movable; the blade blocking portion 9 may not be connected to the blade portion 6 or the lower edge 503 of the striped comb teeth 5, but the gap therebetween may be provided. Under some circumstances, pet hair 300 may enter an area within this gap and be applied to the blade portion 6. However considering the distance of the two components, which may preferably be smaller than the thickness and width of a human finger, more preferably less than 6 cm, so that the user's fingers cannot reach through the gap and touch the blade portion 6, thereby advantageously improving the safety of the pet comb 100.

The blade blocking portion 9 may comprise a connecting portion, whereby the connecting portion permits connection thereof to the mounting head 2 or the hair removal plate 7 and a free end. In this way, at least part of the combing portion 50 of the lower edge 503 of the striped comb teeth 5 may exceed the free end of the blade blocking portion 9. In turn, the free end of the blade blocking portion 9 may exceed or may not exceed the boundary of the combing portion 50 and the blade portion 6.

In this embodiment, the blade blocking portion 9 may be a blade blocking plate which has an upper end side and a lower end side parallel to each other, and the free end is a straight front end side perpendicular to the upper end side and the lower end side. The blade blocking portion 9 may be connected to the hair removal plate through the connecting portion, and may form an angle of 90° with the extending direction of the pushing portion 72 of the hair removal plate 7. That is to say, parallel to the direction in which the striped comb teeth 5 extend. The blade blocking portion 9 may be moved in a back and forth direction with the hair removal plate 7 to adjust the relative position of the blade blocking portion 9 and the blade portion 6.

Considering their material properties and structural characteristics, the connection between the blade blocking portion 9 and the hair removal plate 7 may be by a fixed member, welding, and the like. In this embodiment, preferably, the hair removal plate 7 and the blade blocking portion 9 are integrated, and may be made from plastic, metal materials or other materials.

Referring now to any one of FIGS. 1, 4, 6, and 10 to 18, the pet comb 100 of the present disclosure may further comprise a restriction portion 10, which may be positioned on an alternate side of the striped comb teeth 5, and opposite to the blade portion 6. In this way, when considering the layout, the restriction portion 10 may be assembled at a suitable position of the mounting head 2, the comb body 3, or the hair removal plate 7, and its role is to restrict the pet hair 300 at an inner side of the blade portion 6 together with the free end of the blade blocking portion 9. In this way, the pet comb 100 provided in this embodiment can advantageously function so as to comb, disentangle, and thin pet hair 300. Users such as pet groomers or pet owners using the pet comb 100 may advantageously selectively conduct different operations on the pet hair 300 according to the condition thereof, so as to achieve the purpose of combing, disentanglement or thinning. Thus, in order to better cooperate with the blade blocking portion 9, preferably, the restriction portion 10 may be fixedly connected to the free end of an upper part of the front pushing plate 703 of the hair removal plate 7.

Referring now to any one of FIGS. 10 to 18, the free end of the upper part of the front pushing plate 703 extends to form the restriction portion 10, the hair removal plate 7 and the restriction portion 10 may be integral in construction. The restriction portion 10 may move forward and backward together with the hair removal plate 7 so as to adjust its relative position to the blade portion 6.

Figure 12:
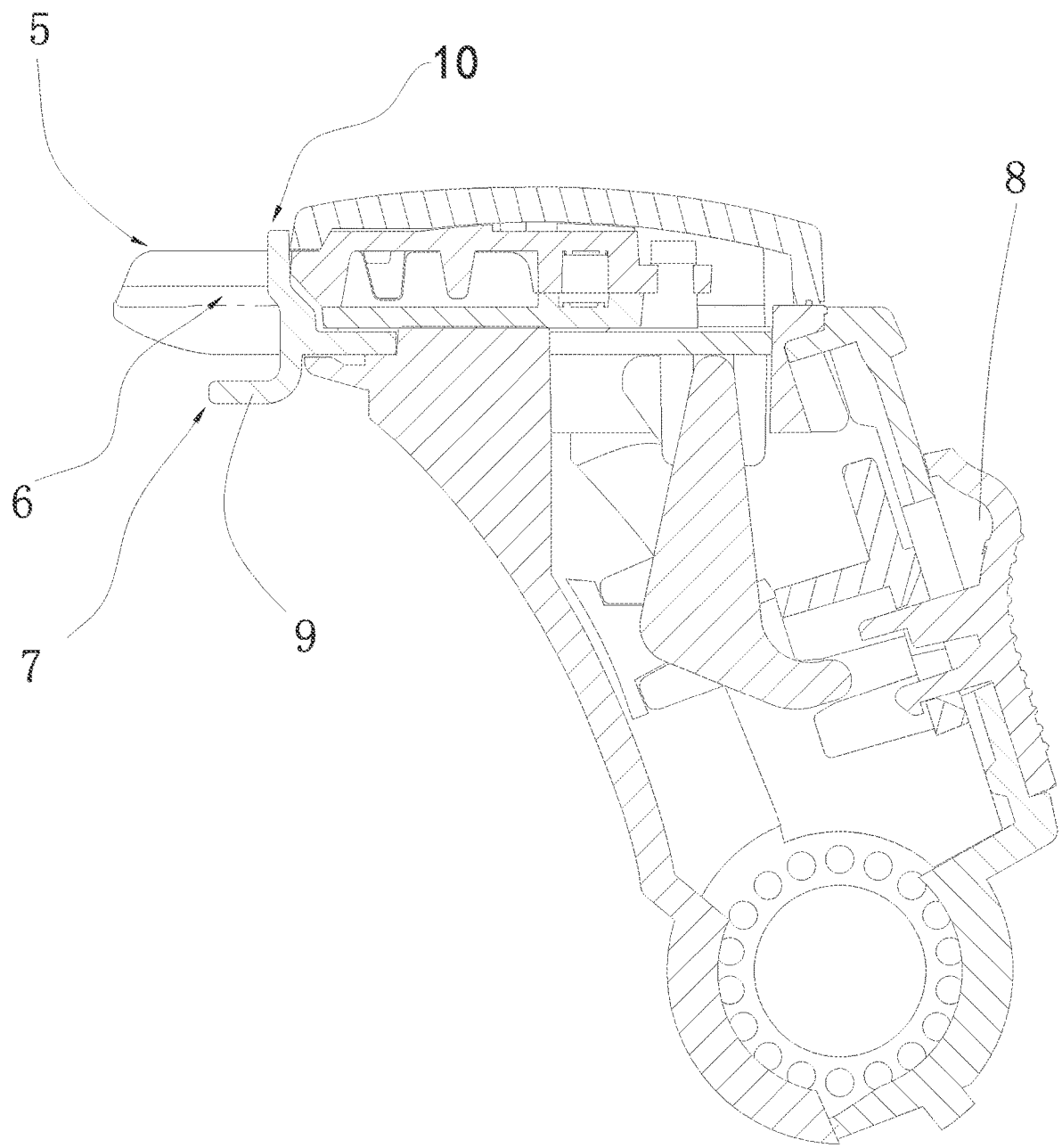
FIG. 12 is a schematic sectional side view of an embodiment of a mounting head of a pet comb under N position.
Figure 13:
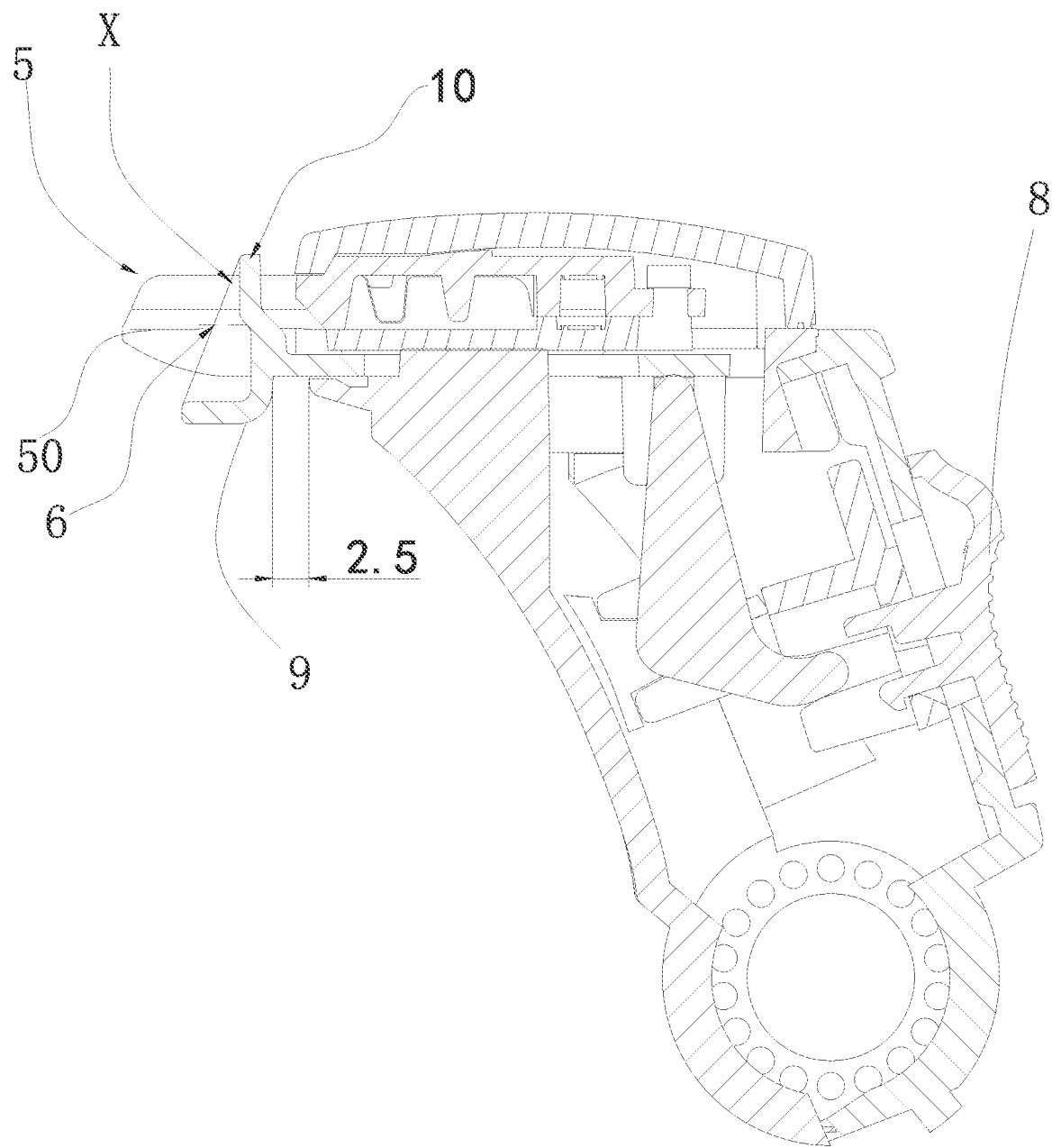
FIG. 13 is a schematic sectional side view of an embodiment of the mounting head of the pet comb of FIG. 12 under first position.
Figure 14:
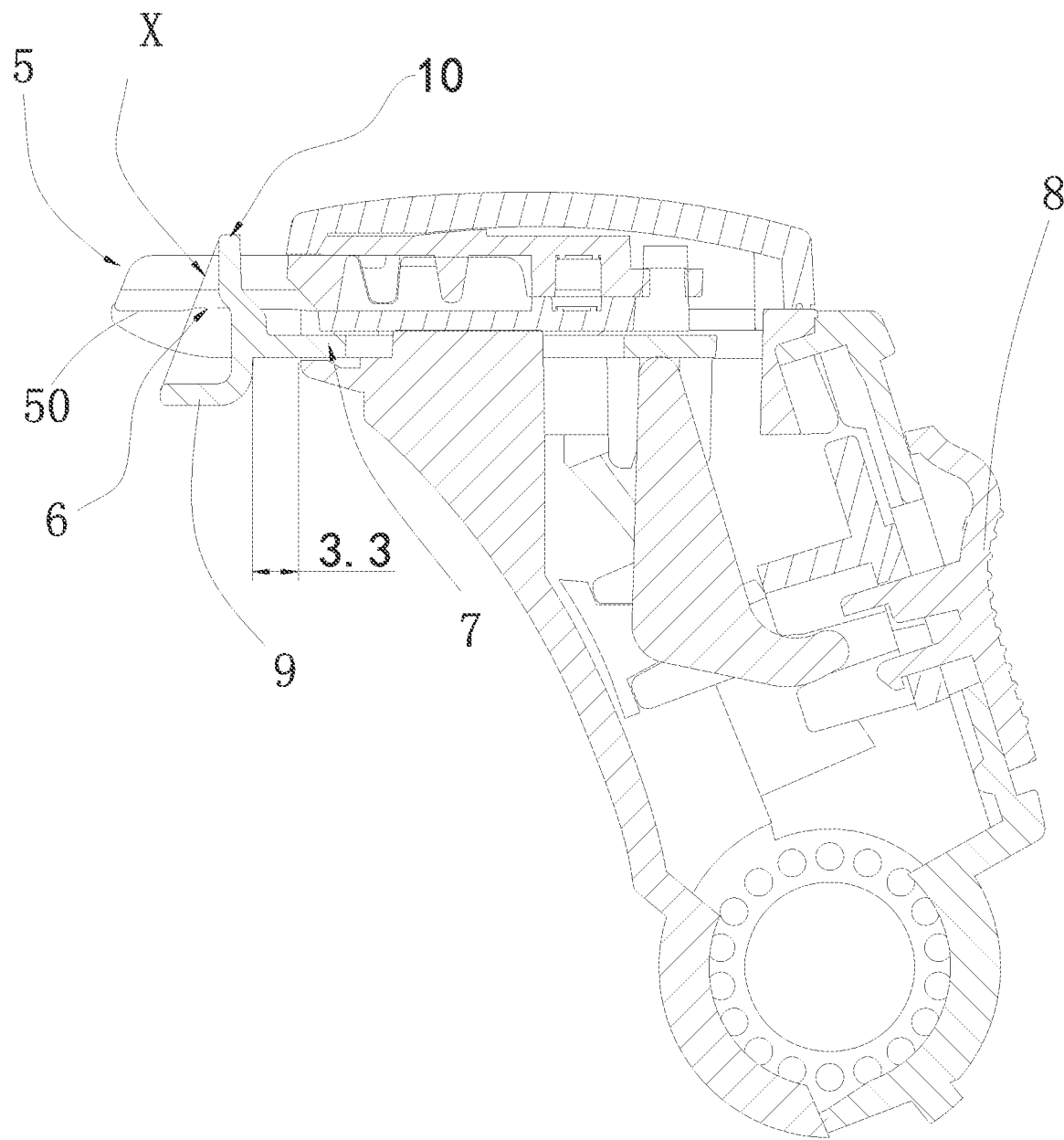
FIG. 14 is a schematic sectional side view of an embodiment of the mounting head of the pet comb of any one of FIG. 12 or 13 under second position.
Figure 15:
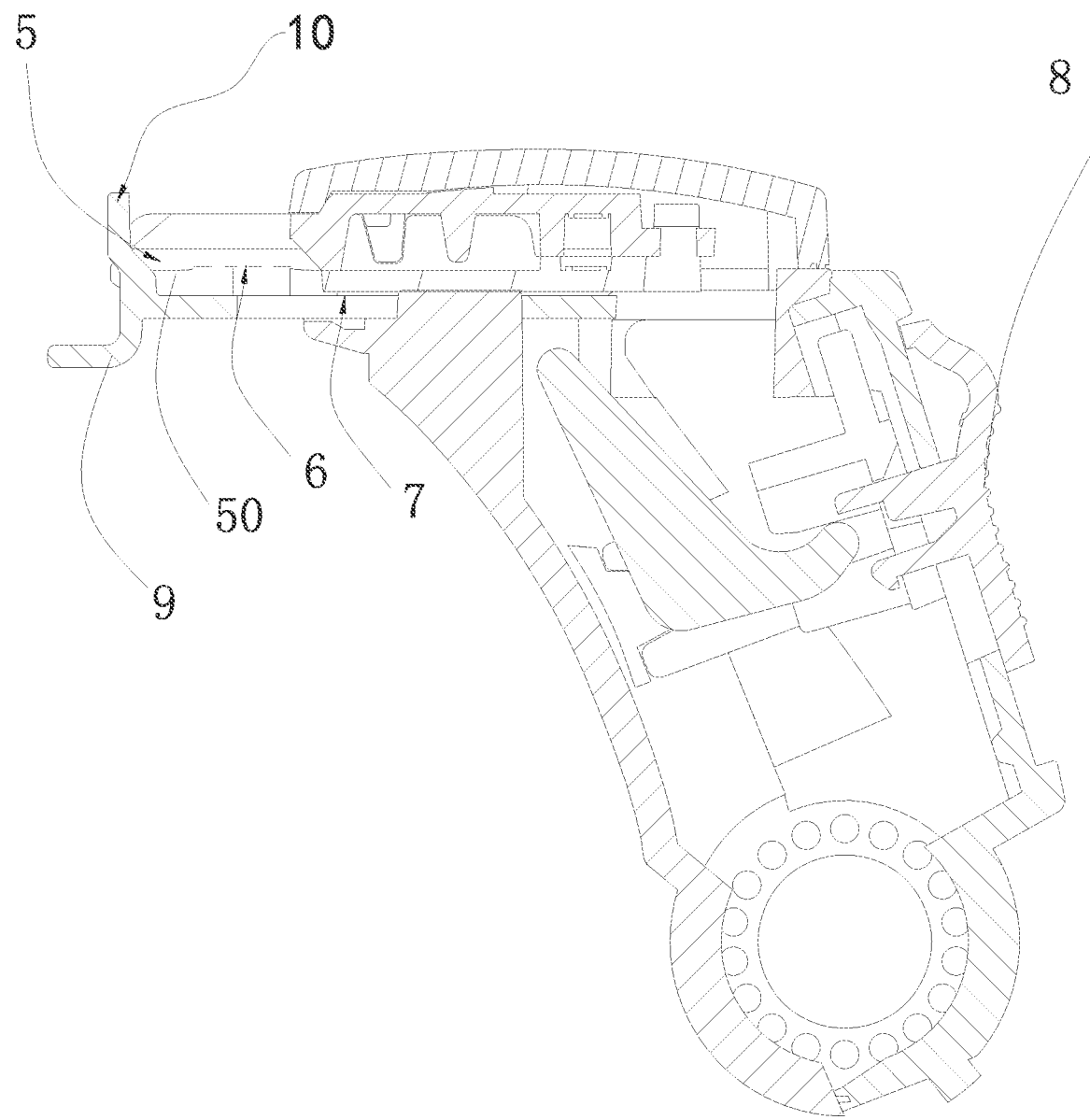
FIG. 15 is a schematic sectional side view of an embodiment of the mounting head of the pet comb of any one of FIGS. 12 to 14 under P position.

In this embodiment, referring now to FIG. 9, the total length L of the combing portion 50 at the lower edge 503 of the striped comb teeth 5 may be 4.6 mm. Referring now to any one of FIGS. 12 to 15, there may preferably be four positions that the hair removal plate 7 may be adjusted by the control button 8: 1) an N position—whereby the hair removal plate 7 is located at the root of the striped comb teeth 5, and the free end of the blade blocking portion 9 does not exceed the boundary of the combing portion 50 and the blade portion 6, in this way part of the blade portion 6 is being exposed (as illustrated by FIG. 12); 2) a first position—whereby the hair removal plate 7 moves 2.5 mm to the front end, and the free end of the blade blocking portion 9 exceeds the boundary of the combing portion 50 and the blade portion 6, in this way a connection line X between the free end of the restriction portion 10 and the free end of the blade blocking portion 9 intersecting with the extension line of the blade portion 6 behind the boundary of the combing portion 50 and the blade portion 6 (as illustrated by FIG. 13); 3) a second position—whereby the hair removal plate 7 moves 3.3 mm to the front end, and the free end of the blade blocking portion 9 further exceeds the boundary of the combing portion 50 and the blade portion 6, in this way the connection line X between the free end of the restriction portion 10 and the free end of the blade blocking portion 9 intersecting with the extension line of the blade portion 6 at the boundary of the combing portion 50 and the blade portion 6 (as illustrated by FIG. 14); 4) a P position—whereby the hair removal plate 7 continues to move toward the front end, and the hair removal plate 7 is completely pushed out and exceeds the front edge 504 of the striped comb teeth 5 (as illustrated by FIG. 15). It will be appreciated by those skilled in the art that the naming of the positions is simply to better explain the four relative positions of the blade portion 6, the blade blocking portion 9 and the restriction portion 10.

The steering transmission mechanism of the control button 8 and the hair removal plate 7 may further comprise a positioning mechanism and a resetting mechanism. In use, when the user presses the control button 8, the control button 8 may be moved up and/or down; whereby when moving to the first position or second position followed by releasing the control button 8, the positioning mechanism may fix the position of the hair removal plate 7 until the user presses the control button 8 again to move. Pressing the control button 8 to P position may completely push the hair removal plate 7 out. In this way, when the control button 8 is released, the resetting mechanism may retract the hair removal plate 7 back to the root of the striped comb teeth 5 and allow it to return to N position.

Referring now to any one of FIGS. 7 and 16 to 18, the function and methods of use of the pet combs 100 includes that the user holds the handle 1 by their hand, the striped comb teeth 5 acts obliquely on the pet body 200 with its rear side contacting the pet hair 300, and the connection line between the blade blocking portion 9 and the restriction portion 10 is substantially parallel to the body side line. In this way, the control button 8 may be controlled by sliding, releasing and adjusting the position of the hair removal plate 7.

Figure 16:
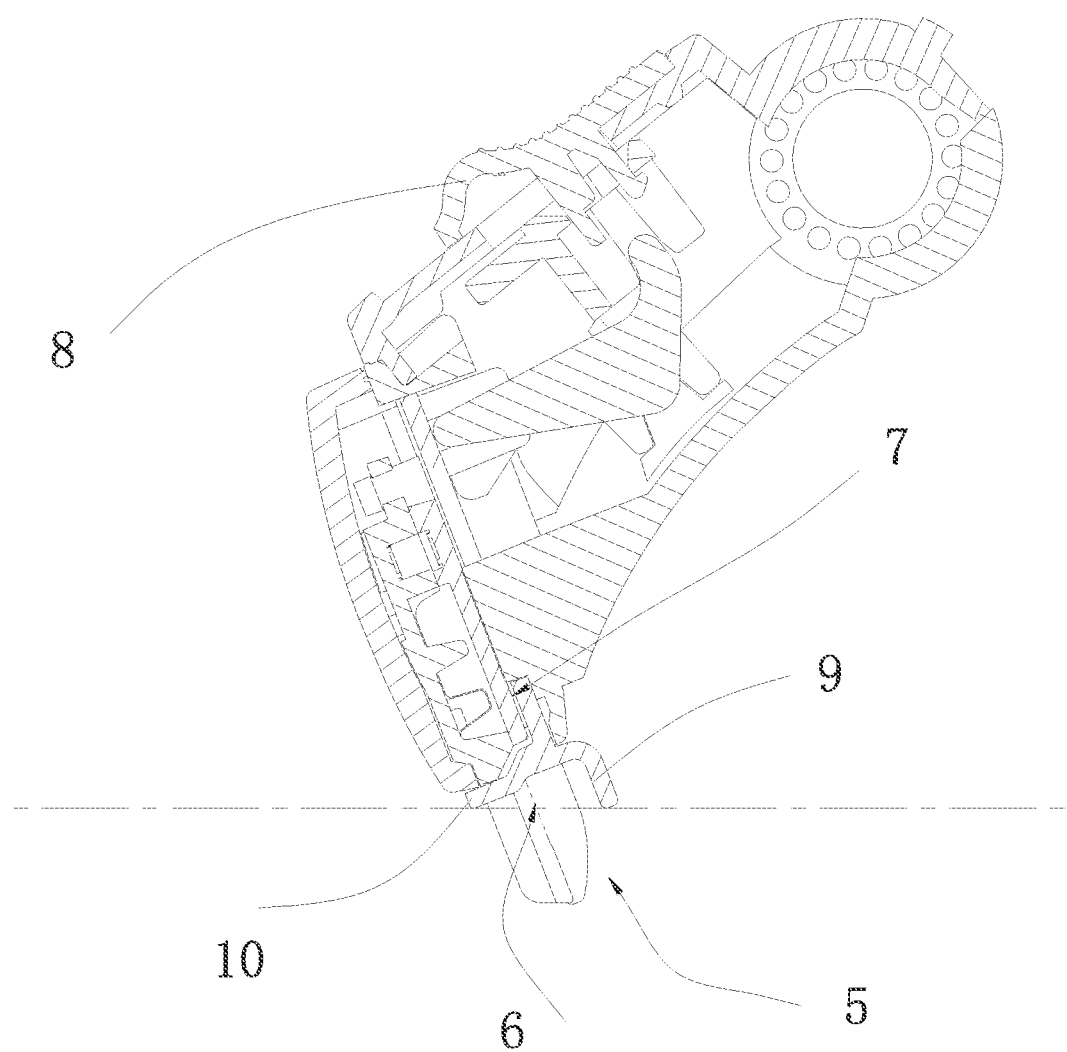
FIG. 16 is a schematic sectional side view of an embodiment of the mounting head of the pet comb of any one of FIGS. 12 to 15, in use, under N position.

Referring now to any one of FIGS. 7, 12 and 16, the hair removal plate 7 is at N position. In this way, the angle a may be formed between the pet body 200 and the striped comb teeth 5, part of the blade portion 6 may be exposed to the pet hair 300, and the smaller the angle a is, the more the blade portion 6 may be exposed. When the user pulls the pet comb 100, the combing portion 50 of the striped comb teeth 5 separates loose pet hair 300, so that the entangled pet hair 300 may slide into the blade portion 6 and be cut by the same, while the rest of the exposed blade portion 6 may thin the loose pet hair 300. In this way, the N position is suitable for combing, disentangling and thinning the hair 300 of a pet which has thick and seriously entangled hair 300.

Figure 17:
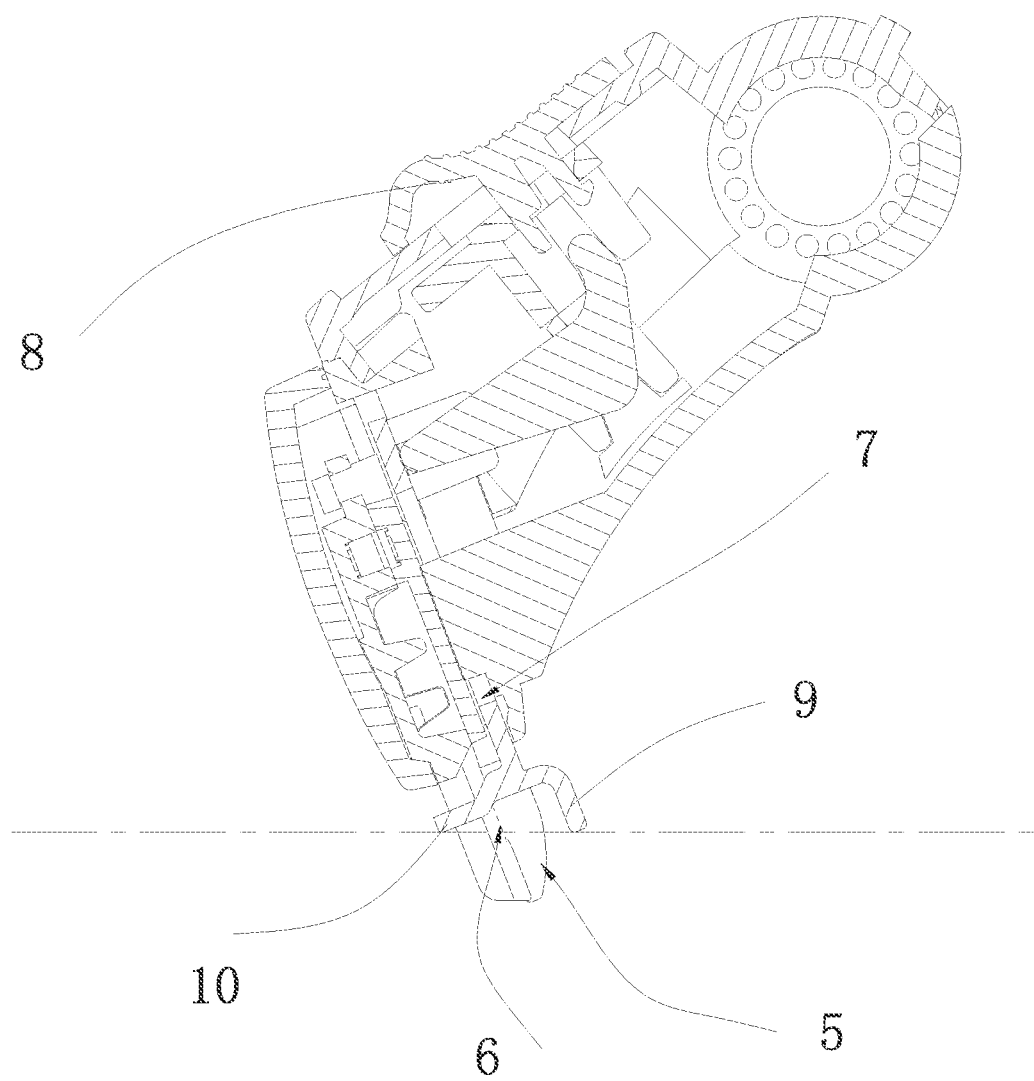
FIG. 17 is a schematic sectional side view of an embodiment of the mounting head of the pet comb of any one of FIGS. 12 to 16, in use, under first position.

Referring now to any one of FIGS. 13 and 17, the hair removal plate 7 is in the first position. In this way, the blade portion 6 may be blocked by the blade blocking portion 9, but a small portion may exceed the connection line between the free end of the restriction portion 10 and the free end of the blade blocking portion 9. Thereby, when the user pulls the pet comb 100, the combing portion 50 of the striped comb teeth 5 separates loose hair 300, so that the entangled hair 300 may slide into the blade portion 6 and be cut by the same. Since the blade portion 6 may basically be blocked by the blade blocking portion 9 and located at an inner side, in this way it may not thin the loose pet hair 300. This position may only be suitable for combing and disentangling pet hair 300 at the same time. This first position may especially be suitable for pets with thinner hair to avoid thinning their hair.

Figure 18:
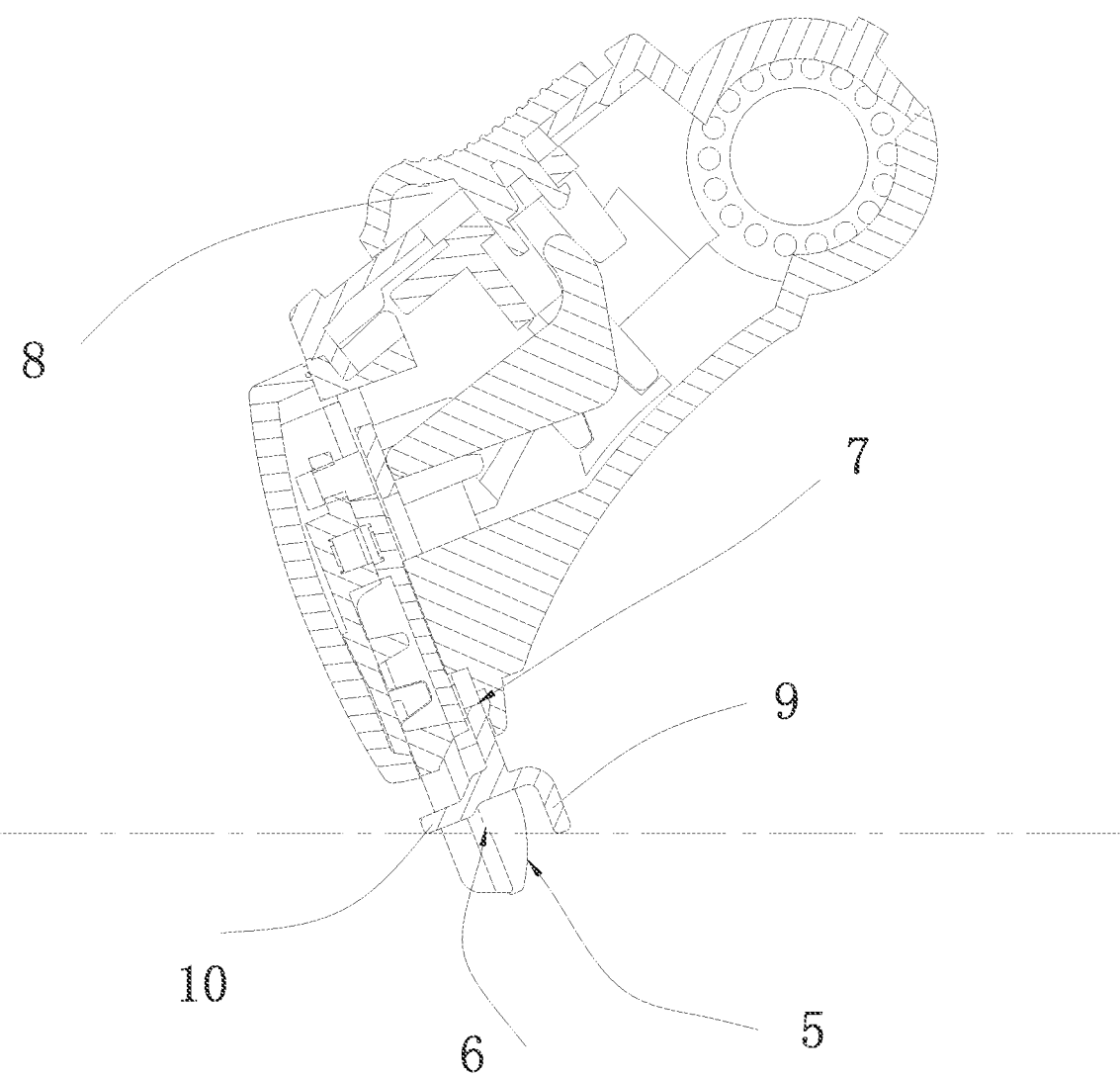
FIG. 18 is a schematic sectional side view of an embodiment of the mounting head of the pet comb of any one of FIGS. 12 to 17, in use, under second position.

Referring now to any one of FIGS. 14 and 18, the hair removal plate 7 is at the second position. In this way, the blade portion 6 may completely be located at an inner side of the connection line X positioned between the free end of the restriction portion 10 and the free end of the blade blocking portion 9, and may completely be blocked by the blade blocking portion 9. When the user pulls the pet comb 100, the combing portion 50 of the striped comb teeth 5 only separates the loose pet hair 300 to comb it, but the blade portion 6 does not achieve any function. Thus, this second position may be suitable for combing pet hair 300 only.

Referring to any one of FIGS. 1 to 18 and the first embodiment, the control button 8 of the pet comb 100 may be pressed to fully push the hair removal plate 7 out and discharge the shed or cut pet hair 300 attached to the rear side of the striped comb teeth 5 or the gap between the striped comb teeth 5. Following this, the control button 8 may then be released to reset the hair removal plate 7.

According to the features and objects of the present disclosure, the change in the relative position of the blade blocking portion 9 and the blade portion 6 may also be achieved by providing a movable blade portion 6. The movable blade portion 6 may comprise a movable striped comb teeth 5 with the blade portion 6 fixed on it.

Second Embodiment

In the second embodiment of the pet comb 100, referring now to any one of FIGS. 19 to 25, it will be appreciated that this embodiment largely encompasses the disclosure of the first embodiment, in which both the first and second embodiments are basically the same except for the blade blocking portion 9S (when compared to the blade blocking portion 9 of the first embodiment), so the repeated structure and functions will not be further described, and only the basic structure and differences between the two embodiments will be described.

Figure 19:
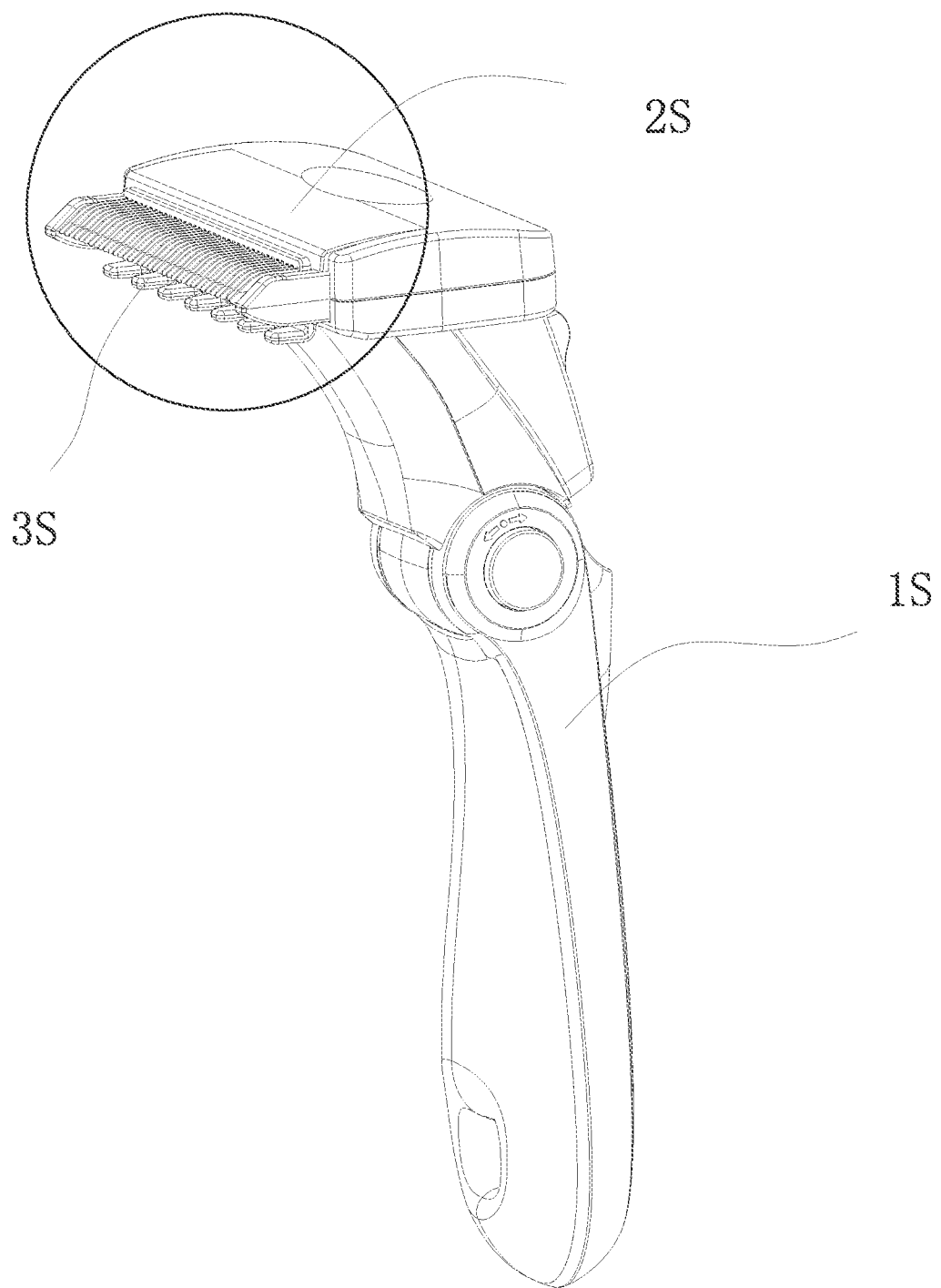
FIG. 19 is a perspective view of a second embodiment of a pet comb.
Figure 20:
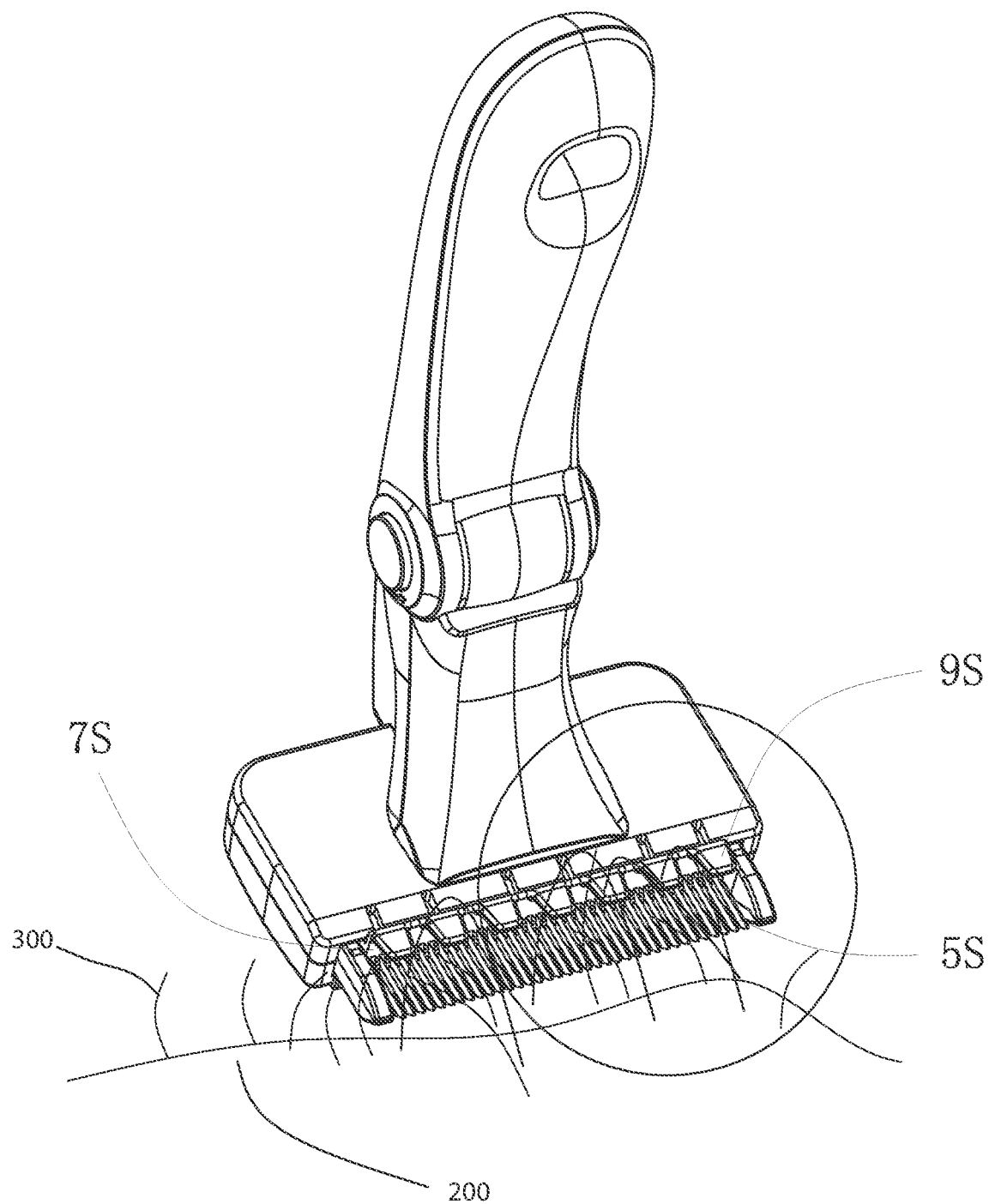
FIG. 20 is an alternate perspective view of the pet comb in use of FIG. 19.

Referring now to any one of FIGS. 19 and 20, the pet comb 100 may be provided by this second embodiment comprising a handle 1S, a mounting head 2S, and a comb body 3S. The handle 1S may be connected to the mounting head 2S, and the comb body 3S is assembled into the mounting head 2S. It will be appreciated by those skilled in the art that the basic structure of the comb body 3S (of the second embodiment of the pet comb 100) may comprise a row of striped comb teeth 5S, and a gap may be provided between two of the striped comb teeth 5S.

Figure 21:
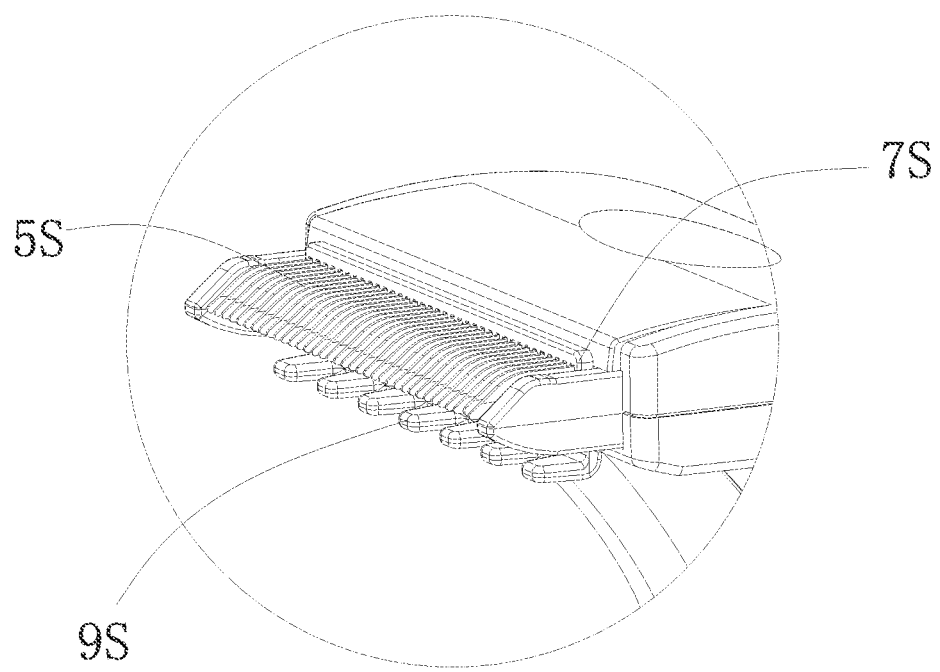
FIG. 21 is a perspective view illustrating Detail A of the pet comb of FIG. 19.
Figure 22:
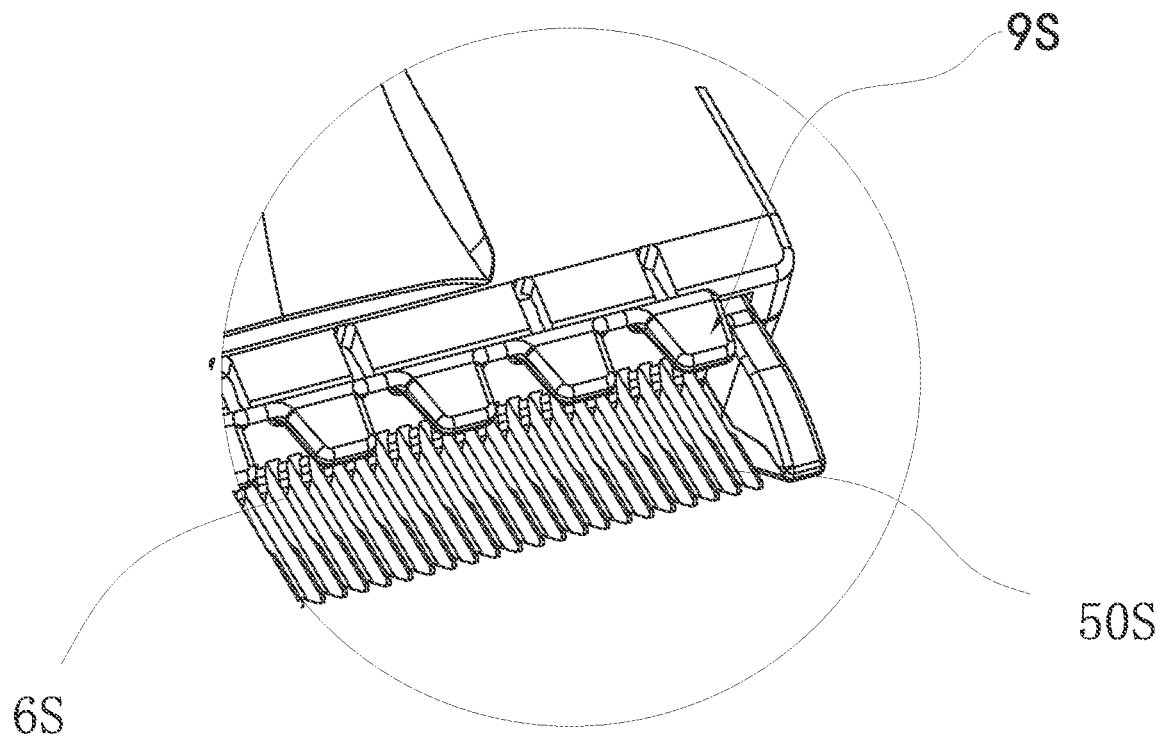
FIG. 22 is a perspective view illustrating Detail B of the pet comb of FIG. 20.
Figure 23:
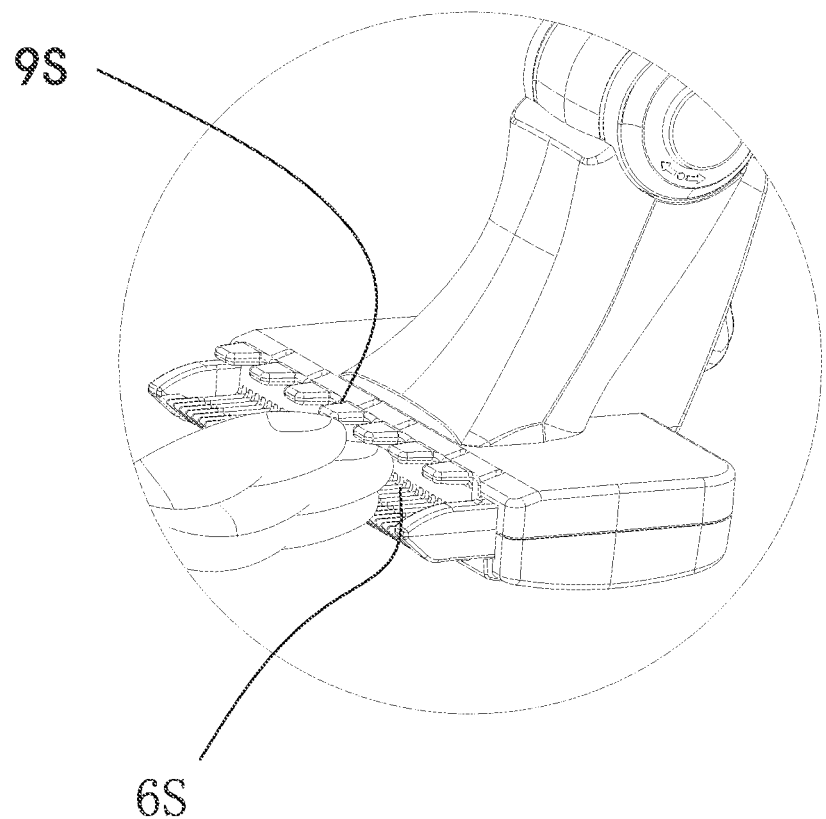
FIG. 23 is a perspective view illustrating a human finger in contact with a comb body of the pet comb of any one of FIGS. 19 to 22.

Referring now to any one of FIGS. 21 to 23, at least part of the rear side of the striped comb teeth 5S is provided with a blade portion 6S. The blade portion 6S may be disposed at an inner section of the striped comb teeth 5S, in this way a combing portion 50S may be provided at an outer section of the blade side of the striped comb teeth 5S. Additionally, the pet comb 100 may also include a hair removal plate 7S, and the striped comb teeth 5S may pass through tooth gaps of the pushing portion 72S of the hair removal plate 7S, and the hair removal plate 7S may move along the extending direction of the striped comb teeth 5S. In this way, the structural composition of the striped comb teeth 5S and the hair removal plate 7S in this second embodiment may be the same as those in the first embodiment, and comprise the combing portion 50S and the blade portion 6S. The arrangement may also be the same as that in first embodiment and thus will not be repetitively discussed.

The pet comb 100 may be provided with a blade blocking portion 9S extending in the direction of the striped comb teeth 5S on the side of the blade portion 6S. The blade blocking portion 9S may be comprised of a plurality of comb teeth-shaped members 91S. A plurality of hair channels 92S may be comprised between each of the comb teeth-shaped members 91S and formed in the same direction as the striped comb teeth 5S to allow hair to enter the gaps between two of the striped comb teeth 5S.

Figure 25:
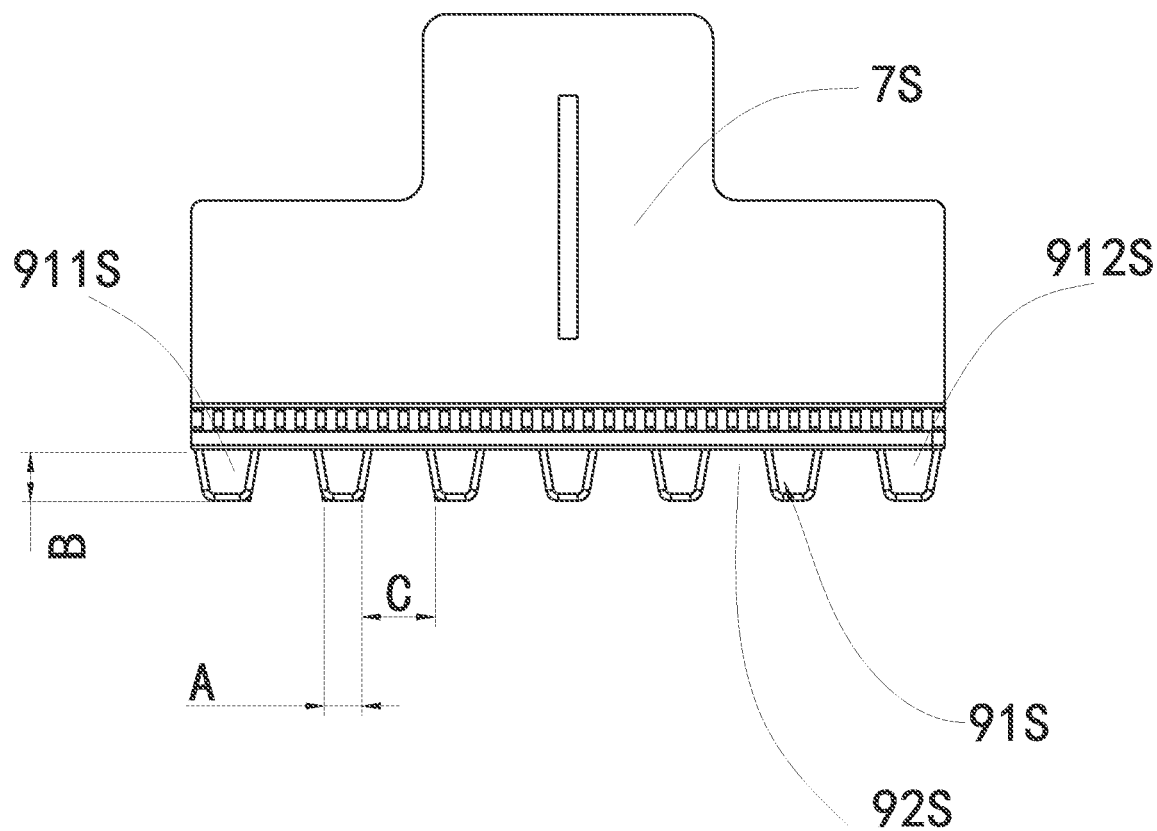
FIG. 25 is a top view of the pushing portion of FIG. 24.

Referring now to FIG. 25, the comb teeth-shaped member 91S may gradually increase in width from outside to inside with its free end being connected to a side thereof through an arc transition to form a semi-shuttle structure. In this embodiment, the hair channel 92S may be formed between two adjacent comb teeth-shaped members 91S, and may decrease in width from outside to inside to form a trumpet-shaped entrance. It will be appreciated that the width of the hair channel 92S may be equal to the width of at least one comb tooth such that hair entering the hair channel 92S may effectively interact with the blade portion 6S for cutting.

When the user pulls the pet comb 100, the pet hair 300 may be separated by the semi-shuttle comb teeth-shaped member 91S, enter the hair channel 92S, and interact with the combing portion 50S and the blade portion 6S, whereby the combing portion 50S of the striped comb teeth 5S separates the loose hair 300, and the entangled hair 300 slides into the blade portion 6S and is cut by the same. The blade blocking portion 9S in this embodiment may improve the safety of the pet comb 100 without affecting the efficiency of pet hair 300 combing and disentanglement.

Figure 24:
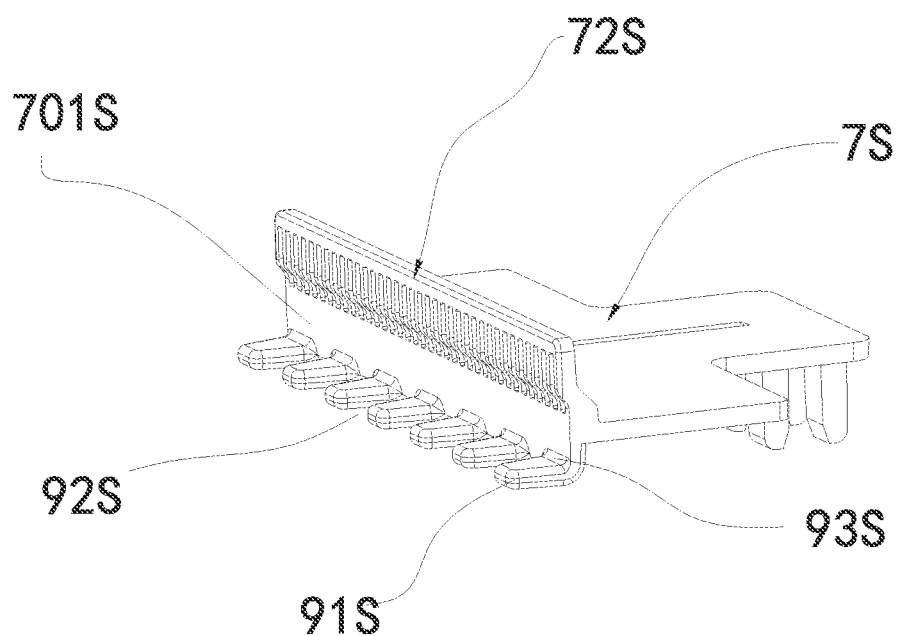
FIG. 24 is a perspective view of an alternate embodiment of a pushing portion.

Referring now to FIG. 24, front ends of all the comb teeth-shaped members 91S may be flush, and rear ends thereof are connecting portions 93S that may be fixedly or movably mounted on the hair removal plate 7S or the mounting head 2S. Preferably, the blade blocking portion 9S may be connected to the hair removal plate 7S, and the extension direction thereof is substantially at an angle of 90° with the extension direction of the pushing portion 72S of the hair removal plate 7S, which may be the direction of the striped comb teeth 5S; in this way the connecting portion 93S and a rear pushing portion 701S of the hair removal plate 7S may be connected by an arc.

In this second embodiment, preferably the comb teeth-shaped member 91S may be a plate of equal thickness with the exception of the connecting portion 93S, the hair channel 92S, and each arc transition, in this way, it has an upper end and a lower end parallel to each other, wherein the upper end or the lower end is parallel to an upper edge or a lower edge of the striped comb teeth 5S. The comb teeth-shaped members 91S may also be uniformly distributed, and each hair channel 92S may be equal in size. Additionally, the size and shape of each comb teeth-shaped member 91S may be the same, with the exception of a first comb teeth-shaped member 911S and a second comb teeth-shaped member 922S located at outermost ends of the comb teeth-shaped members 91S.

Referring now to any one of FIGS. 21 to 23, the free end of the blade blocking portion 9S, that is the front end of the comb teeth-shaped member 91S, advantageously may not exceed the free end of the striped comb teeth 5S. In this way, the combing function of the combing portion 50S is not affected, and the free end of the blade blocking portion 9S may or may not exceed the boundary of the combing portion 50S and the blade portion 6S. In this way, the blade blocking portion 9S may be moved back and forth along with the hair removal plate 7S, and the extending length thereof can be adjusted, thereby permitting adjustment of the action area of the blade portion 6S during use, so that it may be applicable to various pets with various types of hair 300.

In this embodiment, when the user holds the pet comb 100 and acts on a pet's body 200 for hair care, the blade blocking portion 9S isolates the blade portion 6S from the pet's body 200 (it will also be appreciated that it isolates the blade portion 6S from the pets skin 200), leaving the hair 300 between the two, so that no matter how the contact angle between the pet comb 100 and the pet's body 200 side changes, the pet's skin 200 (or pet's body 200) will not be cut or injured, and thus advantageously the pet comb 100 is safer in use.

Additionally in this embodiment, the blade blocking portion 9S may not be in contact with the lower edge of the striped comb teeth 5S, and there may be provided a distance therebetween. It will be appreciated by those skilled in the art, that under certain conditions, part of the pet hair 300 may enter part of this gap from the side of the combing portion 50S or the hair channel 92S, and in this way interact with the blade portion 6S, thereby advantageously improving cutting efficiency. As an additional advantage, the distance between the two is preferably less than the thickness and width of a human finger, so that the user's finger cannot reach through the gap and touch the blade 6S, which improves the safety of the pet comb 100, that is, the distance is not greater than 6 cm, and may preferably be between 3.5 to 6 mm.

Another addition in this embodiment is that the blade blocking portion 9S may be retracted to a very rear end, whereby its free end exceeds or is flush with the boundary of the combing portion 50S and the blade portion 6S; in this way when the blade blocking portion 9S is pushed to a very front end, the blade portion 6S may be blocked by the hair removal plate 7S. In this way an advantage while in use, the blade portion 6S may not be fully exposed to avoid potential safety issues due to the blade being completely exposed.

Furthermore in this embodiment, referring now to FIG. 25, preferably the width A of the front end of the comb teeth-shaped member 91S is 3 mm, the extension length B from the free end thereof to the connecting portion 93S is 4 mm, the width C of the foremost end of the hair channel 92S is 6 mm, and 3 to 4 of the striped comb teeth 5S are provided in the hair channel 92S. As illustrated in FIG. 25, it will be appreciated that in this state, when the pet comb 100 is used for combing pet hair 300 or is being deposited, a human finger cannot enter the blade portion 6S area from the front side or the outer side of the blade blocking portion 9S. That is to say, the blade portion 6S cannot be in contact with the user, advantageously preventing the user from cutting or injuring themselves or their own fingers.

It will be appreciated by those skilled in the art that the technical problem solved by the present disclosure is to provide a pet comb that avoids cutting the pet's skin or the user's hand. The pet comb may also advantageously, selectively provide a hair combing function, or a function or hair disentanglement and thinning.

The pet comb provided by the present disclosure has been described in detail above. The principle and implementation of the present disclosure have been described using specific examples. It will be appreciated that the description of the above embodiments is only used to help understand the present disclosure and the concept of the pet comb 100. It should be noted by those skilled in the art, without departing from the principle of the present disclosure, several improvements and modifications can be made to the present disclosure, and these improvements and modifications also fall within the protection scope of the claims of the present disclosure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

What is claimed is:

1. A pet comb, comprising: a handle, a mounting head and a comb body; wherein the comb body comprises a row of comb teeth; wherein each tooth in the row of comb teeth comprises a top edge, a bottom edge, and a front edge, wherein the top edge and the bottom edge are parallel to each other, wherein the front edge connects the top edge to the bottom edge, and wherein the bottom edge comprises a notch; wherein a blade side of each given tooth of a row of comb teeth comprises a combing portion disposed at an outer section of said given tooth and a blade portion disposed at an inner section of said given tooth, wherein the blade portion is integrated into said given tooth in the notch, and wherein a cutting edge of the blade portion is oriented toward the handle; wherein a row of comb teeth are provided with a restriction portion and a blade blocking portion, the blade blocking portion extending in a direction of a row of comb teeth on the blade side; whereby at least part of the combing portion exceeds a free end of the blade blocking portion, and the blade blocking portion blocks at least part of the blade portion; wherein the restriction portion is provided on an alternate side of a row of comb teeth, and the restriction portion and the free end of the blade blocking portion together restrict hair and an inner end of the blade portion; and wherein the blade blocking portion is slidably connected to the combing portion such that the cutting edge of the blade portion is disposed at an inner side of a connection line between a free end of the restriction portion and the free end of the blade blocking portion when the combing portion exceeds the blade blocking portion.

2. The pet comb of claim 1, wherein the free end of the blade blocking portion exceeds a boundary of the combing portion and the blade portion.

3. The pet comb of claim 1, wherein an extending length of the blade blocking portion is adjustable.

4. The pet comb of claim 1, wherein the blade blocking portion and the blade portion are separated by a distance, and the blade blocking portion is configured to prevent a user from being injured or cut by the blade portion.

5. The pet comb of claim 1, wherein the restriction portion is fixedly or movably disposed on the mounting head, the comb body or the hair removal plate.

6. The pet comb of claim 1, wherein the blade blocking portion is fixedly or movably disposed on a hair removal plate or the mounting head.

7. The pet comb of claim 6, wherein the blade blocking portion is a blade blocking plate connected to the hair removal plate by a connecting portion.

8. The pet comb of claim 6, wherein the blade blocking portion is a blade blocking plate that extends in parallel with the row of comb teeth.

9. The pet comb of claim 6, wherein the blade blocking portion is a blade blocking plate and wherein the hair removal plate is integrated with the blade blocking plate.

10. The pet comb of claim 1, wherein relative positions of the blade portion, the restriction portion and the blade blocking portion are adjustable and fixable.

11. The pet comb of claim 10, wherein the restriction portion is integrated with the hair removal plate.

* * * * *